United States Patent [19]

Emmons et al.

[11] 4,303,563

[45] Dec. 1, 1981

[54] COATING, IMPREGNATING AND ADHESIVE COMPOSITIONS CURABLE AT AMBIENT TEMPERATURE

[76] Inventors: William D. Emmons, 1411 Holcomb Rd., Huntingdon Valley, Pa. 19006; Wayne E. Feely, 1172 Lindsay La., Rydal, Pa. 19046

[21] Appl. No.: 99,673

[22] Filed: Dec. 3, 1979

Related U.S. Application Data

[63] Continuation-in-part of Ser. No. 965,673, Jan. 1, 1978, and a continuation-in-part of Ser. No. 865,568, Dec. 29, 1977, abandoned.

[51] Int. Cl.$^3$ .................... C08F 18/24; C08F 26/08
[52] U.S. Cl. .................... 260/23 AR; 525/257; 525/305; 525/329; 525/374; 525/386
[58] Field of Search .............. 260/23 AR; 525/329, 525/374, 257, 305, 386

[56] References Cited

U.S. PATENT DOCUMENTS

| | | | |
|---|---|---|---|
| Re. 30,234 | 3/1980 | Sampson et al. | 525/386 |
| 2,949,445 | 8/1960 | Blake | 525/379 |
| 3,037,969 | 6/1962 | Hankins et al. | 525/384 |
| 3,125,592 | 3/1964 | Nevin | 526/75 |
| 3,497,485 | 2/1970 | Emmons | 526/265 |
| 3,637,559 | 1/1972 | Pinkney | 525/310 |
| 3,876,518 | 4/1975 | Borden et al. | 204/159.23 |
| 3,940,549 | 2/1976 | Whittum et al. | 428/484 |
| 3,963,806 | 6/1976 | Dornte | 525/417 |
| 4,037,018 | 7/1977 | McGinniss | 428/418 |
| 4,045,416 | 8/1977 | Robson et al. | 525/308 |
| 4,054,717 | 10/1977 | Gill et al. | 428/452 |
| 4,058,657 | 11/1977 | Ireland | 526/263 |
| 4,101,493 | 7/1978 | Nakagawa et al. | 525/305 |
| 4,157,418 | 6/1979 | Heilmann | 526/263 |

*Primary Examiner*—Ronald W. Griffin

[57] ABSTRACT

Addition polymers containing a plurality of terminal and/or pendant amine groups in which the nitrogen atom of at least some of such groups is of primary or secondary character, or aldimine or ketimine groups form the main film-forming component in compositions for coating and the like purposes, which also contain a polyfunctional acrylic monomer, such as ethylene glycol diacrylate, with or without monoethylenically unsaturated acrylic ester. Such compositions provide durable films having excellent mechanical and resistance properties even on ambient curing though baking may be used to accelerate the cure. A method of use is also disclosed in which the components are mixed in suitable vehicles, e.g. dispersant or solvent media, optionally with fillers and/or pigments, as desired, and after application of the composition, such as for coating, it is cured by exposure to ambient conditions, naturally occurring or controlled, or it is cured at elevated temperatures or by applying a plurality of curing conditions in succession, e.g. first to ambient conditions and subsequently to elevated temperatures in one or more stages of baking.

39 Claims, No Drawings

COATING, IMPREGNATING AND ADHESIVE COMPOSITIONS CURABLE AT AMBIENT TEMPERATURE

CROSS-REFERENCE TO RELATED APPLICATION

This application is a continuation-in-part of our copending application Ser. No. 965,673, filed Jan. 1, 1978, and of our copending application Ser. No. 865,568 filed Dec. 29, 1977, now abandoned.

DESCRIPTION OF THE INVENTION

In accordance with the present invention compositions for coating, impregnating, and adhesive application are formed of (1) a soluble addition polymer containing a plurality of primary or secondary amine groups, or aldimine or ketimine groups, pendant from various spaced mers or polymer units in the polymer chain, such groups being in free base form or in the form of a salt of an organic or inorganic acid, and (2) one or more polyethylenically unsaturated compounds, monomeric or polymeric in character, having at least two unsaturated ester groups of the general formula I

with or without a monofunctional unsaturated monomer having the general formula IV hereinafter.

The ester groups of formula I are herein designated acryloxy groups. It has been found that the specific acryloxy group favors cure at lower ambient temperatures and for that reason the component (2) above is preferably a compound containing at least two acryloxy units.

Component (1) above is frequently referred to hereinafter for the sake of simplicity as an amine-containing polymer but it is to be understood that such passages are intended to embrace component (1) polymers containing imine groups, i.e. aldimine and ketimine groups or the salts of the amine or imine groups with acids, except where the context is clearly and completely inconsistent with such broader construction. Component (1) is an uncrosslinked linear vinyl addition polymer (the term "linear" being construed to include branched as well as straight chain linkages), or a mixture of such polymers, which may have an average molecular weight from as low as about 600 number average ($\overline{M}_n$) to several hundred thousand number average ($\overline{M}_n$), e.g., 300,000 or higher. For many purposes, the amine-containing polymer is preferably one having a low molecular weight (e.g. up to 15,000 $M_n$) and in some cases having sufficient hydrophilic groups, e.g. —NH$_2$, —NHR (R being lower alkyl), —OH, —COOH, or depending on pH the carboxyl may be in the form of amine, alkali metal, or ammonium salts, e.g. —COONH$_4$, to render this component water-dispersible or even water-soluble. On the other hand, the amine-containing polymers may be of intermediate to moderately higher molecular weight, e.g. 30,000 to 300,000 number average and range in soluble nature from water-soluble to organic solvent soluble.

The addition polymers constituting component (1) may be made by direct vinyl addition polymerization of a monoethylenically unsaturated monomer containing an amine precursor group if suitable conditions are maintained during the polymerization. Thus, acid salts of the amine-group containing monomer, such as aminoethyl (meth)acrylate hydrochloride, may be polymerized, or the "blocked amine" monomers of ketimine or aldimine types disclosed in U.S. Pat. Nos. 3,037,969 and 3,497,485 may be polymerized to produce the component (1).

Alternatively, a component (1) polymer may be made by making an addition polymer of one or more (meth)acrylic esters, having the molecular weight desired and subjecting the ester polymer to aminolysis (amidation) by means of a polyamine, especially an aliphatic polyamine, having at least two amine groups, at least two of such amine groups being primary or secondary. Primary amines in the amidation products may be converted to imine groups by reaction with a ketone or aldehyde.

In those embodiments wherein component (1) is of low molecular weight, e.g. 600 to 15,000, preferably 1000 to 5000, number average ($\overline{M}_n$), low molecular weight polymers containing (meth)acrylic acid esters, or such polymers also containing polymerized units of other monoethylenically monomers, especially those selected from (C$_2$ to C$_{20}$)alpha-olefins, e.g. ethylene, propylene, and propylene-trimer, styrene, vinyltoluene, acrylic acid, methacrylic acid, and (meth)acrylonitrile may first be prepared and the polymer of (meth)acrylate ester units may then be reacted with a polyamine, such as ethylenediamine or diethylenetriamine, to convert ester units into amino-amide units.

Thus, component (1) may be the aminolysis product of a lower alkyl (meth)acrylate polymer, e.g. having a number average ($\overline{M}_n$) molecular weight of 600 to 15,000 preferably of a methyl acrylate (MA) copolymer in which the molar proportion of MA is from 2 to 35% and the comonomer(s) making up the balance of the copolymer may be composed of mers (polymerized units) of one or more monoethylenically unsaturated monomeric compounds having a group H$_2$C=C<, such as methyl methacrylate, ethyl acrylate or methacrylate, a (C$_3$–C$_{18}$)alkyl (meth)acrylate, e.g. butyl acrylate or methacrylate, hexyl acrylate or methacrylate, 2-ethylhexyl acrylate or methacrylate, styrene, vinyltoluene, ethylene (or other α-olefin), acrylonitrile, hydroxyethyl acrylate or methacrylate, and, in limited amounts, acrylic acid or methacrylic acid.

The proportion of methyl acrylate, since it is the (meth)acrylate most susceptible to aminolysis, may be, and is preferably, predetermined to provide sufficient ester mer units in the polymer available for aminolysis to assure that the desired amount of amino groups are introduced by the aminolysis procedure. The other monomers may be selected on the basis of their contributions of hydrophobicity, flexibility, hardness, durability to weathering, e.g. ultraviolet light stability, resistance to water and other solvents, such as gasoline. If desired, ethyl acrylate or even a higher alkyl acrylate may be used as the aminolysis-susceptible component of the starting polymer-alternatively methyl methacrylate or higher methacrylate may be so used.

The polyamine used for the aminolysis should contain at least two primary or secondary amine groups and the nitrogen atoms should be attained to aliphatic carbon atoms rather than aromatic carbon atoms. Representative polyamines useful for the aminolysis are:

ethylenediamine (EDA)
diethylenetriamine (DETA)
trimethylenediamine
triethylenetetramine (TETA)
tetraethylenepentamine (TEPA)
pentamethylenediamine
hexamethylenediamine
methanediamine
4,4'-methylenebis (cyclohexylamine)
bis(aminomethyl)-cyclohexane
piperazine
N-aminoethylpiperazine
tris-(aminoethyl)amine
propylenediamine (PDA)
dipropylenetriamine (DPTA)
tripropylenetetramine (TPTA)
1,3-butylenediamine
1,4-butylenediamine
N-(aminoethyl)-ethanolamine A preferred class of polyamines in respect to availability, effectiveness and economy are those of the formula $$H_2N-R°-(NR°)_n-NH_2 \quad (II)$$
$$\overset{H}{|}$$

wherein R° is an alkylene group having 2 to 3 carbon atoms and n is 0, 1, 2 or 3. Of this class, ethylenediamine generally provides optimum results.

Thus, component (1) may consist essentially of a vinyl addition polymer, especially a copolymer, having a molecular weight up to several hundred thousand viscosity average, preferably of lower molecular weight in the range of number average molecular weight ($\overline{M}_n$) from about 600 to 15,000, even up to 20,000, and containing from 2 to 95, preferably from 2 to 35, mole percent of (meth)acrylamide mers or units in which the amide nitrogen atom is substituted by an aliphatic hydrocarbon group carrying one or more primary or secondary amino groups, the hydrogen atoms of such amino groups being available for reaction with a (meth)acryloxy group of monomeric or polymeric compounds of polyfunctional character in respect to their content of (meth)acryloxy groups of formula I above.

These amino-amide units, if a polyamine of the preferred class of polyamine reactions set out under formula II above is used, may have the general formula $$\begin{array}{c} R \\ | \\ -(CH_2-C)- \\ | \\ O=C-NH-R°-(NR°)_n-NH_2 \\ \phantom{O=C-NH-R°-(NR°)_n-}| \\ \phantom{O=C-NH-R°-(NR°)_n-}H \end{array} \quad (III)$$

and in the specific instance wherein ethylenediamine is the reactant used and the ester units in the polymer that are aminolyzed are alkyl (meth)acrylate units, the amino-amide units in the aminolyzed polymer have the specific structure of the formula $$\begin{array}{c} -(H_2C-CR)- \\ | \\ O=C-NHCH_2CH_2NH_2 \end{array} \quad (IIIA)$$

wherein R is H or CH$_3$.

As part or all of the component (1) polymer, there may be used, as stated hereinabove, a vinyl addition polymer or copolymer containing aldimine or ketimine groups obtained by polymerization of the monomeric (meth)acryloxyalkyl ketimines or aldimines of formulas I, II and III of U.S. Pat. No. 3,037,969 (herein designated as formulas H-I, H-II, and H-III respectively) or the (meth)acryloxyalkoxyalkyl ketimines or aldimines of formula I of U.S. Pat. No. 3,497,485 (herein designated formula E-I) and the disclosure of these two patents is incorporated herein by reference. Thus, the monomeric imine compounds of U.S. Pat. No. 3,037,969 of Hankins et al. are those having the three formulas:

$$\begin{array}{c} H_2C=C-(CH_2)_{n-1}H \\ | \\ COOAN=C \begin{array}{c} \diagup R' \\ \diagdown R^2 \end{array} \end{array} \quad (H\text{-}I)$$

$$\begin{array}{c} H_2C=C-(CH_2)_{n-1}H \\ | \\ COOAN=C-(CH_2)_m\overline{\phantom{xxx}} \end{array} \quad (H\text{-}II)$$

and $$\begin{array}{c} H_2C=C-(CH_2)_{n-1}H \\ | \\ COOAN=CHR^3 \end{array} \quad (H\text{-}III)$$

where
m is an integer having a value of 4 to 5,
n is an integer having a value of 1 to 2,
A is a C$_2$-C$_{12}$ alkylene group,
R' is a (C$_1$-C$_{12}$)alkyl or cycloalkyl group,
R$^2$ is a (C$_1$-C$_{12}$)alkyl or cycloalkyl group, and
R$^3$ is selected from the group consisting of phenyl, halophenyl, and alkoxyphenyl in which the alkoxy group has one to four carbon atoms,
and those of U.S. Pat. No. 3,497,485 of Emmons are those having the formula:

$$\begin{array}{c} H_2C=C-(CH_2)_{m-1}H \\ | \\ CO-(D)_{n''-1}-(B)_{n'-1}-(A')_{n-1}-N=Q \end{array} \quad (E\text{-}I)$$

wherein:
Q is selected from the group consisting of $$=C\begin{array}{c} \diagup R^1 \\ \diagdown R^2 \end{array}, \quad =C-(CHR)_x\overline{\phantom{xxx}}, \text{ and } =CHR_3$$

R is H or it may be methyl in one CHR unit,
R$^1$ is selected from the group consisting of (C$_1$-C$_{12}$) alkyl and cyclohexyl groups,
R$^2$ is selected from the group consisting of (C$_1$-C$_{12}$) alkyl and cyclohexyl groups,
R$^3$ is selected from the group consisting of phenyl halophenyl, (C$_1$-C$_{12}$) alkyl, cyclohexyl, and (C$_1$-C$_4$)alkoxyphenyl groups,
A', B, and D are the same or different oxyalkylene groups having the formula $$\begin{array}{c} R° \quad R° \\ | \quad\;\; | \\ -O-CH-CH- \end{array}$$

R° being individually selected from the group consisting of H and alkyl radicals having 1 to 2 carbon atoms, m is an integer having a value of 1 to 2, x is an integer having a value of 4 to 5, n is an integer having a value of 1 to 200, n' is an integer having a value of 1 to 200, n" is an integer having a value of 1 to 200, the sum of n-1, n'-1, and n"-1 having a value of 2 to 200.

These imine-containing polymers are in effect, polymers containing blocked primary amine groups. Hence, they provide longer pot-life times since their operation depends on liberation and evaporation of the aldehyde or ketone from the imine nitrogen. Both of these patents disclose the mixing of copolymers containing 5 to 25% by weight of an aldimine or ketimine with polyepoxides to produce insoluble and infusible cross-linked coatings. They do not, however, disclose or suggest the cold-curing reaction of the present invention which requires that component (2) used therein contains a polyfunctional unsaturated compound having at least two (meth)acryloxy groups of formula I. The resulting products are quite distinct.

Component (2) of the compositions of the present invention for coating, impregnating, and adhesive purposes consists essentially of one or more polyfunctional compounds of monomeric or polymeric (condensation, addition, or vinyl addition types) character containing two or more unsaturated acryloxy groups of formula I hereinabove. Of these, the specific acryloxy groups are preferred. It has been found that the primary and secondary amino groups, e.g. on amino-amide units in component (1), or the primary amine groups developed from imine groups in component (1), undergo, even at ambient temperature, addition across the double bond of the acryloxy units of component (2). The concurrent addition reaction of an amino group of each of several molecules of component (1) to acryloxy units of a polyfunctional component (2) compound serves to crosslink component (1) and thereby to cure the composition containing both components.

By the term "polyfunctional acrylate", it is intended herein to refer to compounds containing two or more unsaturated acryloxy groups. Examples of such compounds that are useful as part or all of component (2) are:

ethylene glycol diacrylate
diethylene glycol diacrylate
propylene glycol diacrylate
trimethylene glycol diacrylate
neopentyl glycol diacrylate
1,3-butylene glycol diacrylate
1,4-butylene glycol diacrylate
1,6-hexamethylene glycol diacrylate
1,10-decamethylene glycol diacrylate
trimethylolpropane triacrylate
pentaerythritol tetraacrylate, and
pentaerythritol triacrylate.

There may also be used more complex types of polyfunctional acrylates obtained by reaction of a acryloxy-containing compound, such as acrylic acid, acrylyl halide, or a acrylic acid ester, with various compounds, such as hydroxy-containing alkyd resins, polyester condensates, or polyether condensates. These complex acrylated products may in some instances be termed "polymeric", since the acryloxy groups may be joined to a condensation polymer, e.g. a polyester or a polyurethane, to an addition polymer, e.g., a polyether, or to a vinyl addition polymer, e.g. a glycidyl acrylate polymer. Examples include:

(A) Urethane acrylates obtained by reacting isocyanate groups of a polyisocyanate, such as hexamethylene diisocyanate with a hydroxyalkyl acrylate, e.g. hydroxyethyl acrylate. These polyurethane polyacrylate monomers are disclosed in U.S. Pat. No. 3,297,745.

(B) Polyether acrylates obtained by esterification of hydroxy-terminated polyethers with acrylic acid as disclosed in U.S. Pat. No. 3,380,831.

(C) Polyesters having at least two acrylate groups obtained by esterifying hydroxyl groups with acrylic acid as disclosed in U.S. Pat. No. 3,935,173.

(D) Polyfunctional acrylates disclosed in U.S. Pat. No. 3,560,237, e.g. obtained by reaction of a hydroxyalkyl acrylate, e.g. hydroxyethyl acrylate, with any one of:

(a) Dicarboxylic acids having from 4 to 15 carbon atoms, (b) Polyepoxides having terminal glycidyl groups, (c) Polyisocyanates having terminal reactive isocyanate groups.

(E) Acrylate-terminated polyesters made from acrylic acid, a polyol having at least three hydroxyl groups, and a dicarboxylic acid (U.S. Pat. No. 3,567,494).

(F) Polyacrylates obtained by the reaction of acrylic acid with at least two epoxy groups of epoxidized drying oils, such as soybean oil, linseed oil, and the like, e.g. epoxidized corresponding drying oil fatty acid, an ester or amide thereof, or the corresponding alcohol, containing at least 2 epoxy groups. Such polyfunctional acrylates are disclosed in U.S. Pat. No. 3,125,592.

(G) Polyacrylates which are urethane or amine derivatives of the polyacrylated epoxidized drying oils, fatty acids and the like described in (F) and U.S. patent mentioned therein, obtained by the reaction of isocyanate(s) or amine(s) respectively with the polyacrylated epoxidized drying oils, fatty acids, and the like described in U.S. Pat. No. 3,125,592. The urethane and amine derivatives retain some or all of the acrylate groups and are disclosed in U.S. Pat. Nos. 3,876,518 and 3,878,077.

(H) Polyacrylates obtained by reaction of acrylic acid by addition to the epoxy groups of aromatic bisphenol-based epoxy resins as disclosed in U.S. Pat. No. 3,373,075.

(I) Polyacrylates obtained by the addition of acrylic acid to a linear vinyl polymer having pendant glycidyl groups, e.g. polymers of glycidyl acrylate or of vinyl glycidyl ether or vinyl glycidyl sulfide as disclosed in U.S. Pat. No. 3,530,100.

(J) Polyfunctional acrylates derived from acrylic acid anhydride and polyepoxides as disclosed in U.S. Pat. No. 3,676,398.

(K) Polyfunctional acrylate urethane esters obtained from the combining of hydroxyalkyl acrylates, a diisocyanate, and a hydroxyl functional alkyd condensate as disclosed in U.S. Pat. No. 3,673,140.

(L) Acrylate terminated urethane polyesters obtained by reaction of a polycaprolactone diol or triol with an organic polyisocyanate, e.g. a diisocyanate, and a hydroxyalkyl acrylate. Such products are disclosed in U.S. Pat. No. 3,700,643.

(M) Urethane polyacrylates obtained by reaction of a hydroxyl-containing ester of a polyol with acrylic acid and a polyisocyanate, such as those described in U.S. Pat. No. 3,759,809.

The disclosure in the patents mentioned above in each of paragraphs (A) through (M) are incorporated herein by reference insofar as they disclose the polyacryloxy-containing compounds and the processes of making them.

Preferred polyfunctional unsaturated compounds of the "complex" type above for use in component (2) are the acrylic acid adducts to polyepoxides in which the epoxy group is attached to adjacent carbon atoms, that is the epoxy groups is a vic-epoxy group. The polyepoxide may be any epoxidized vegetable or animal oil having ten or more carbon atoms in the fatty acid component and sufficient unsaturation to provide at least two epoxy groups in the epoxidized oil. Drying oils or semi-drying oils such as linseed oil or soybean oil are especially useful for epoxidation and subsequent acrylation. The polyepoxide to be acrylated may be any resin-forming polyepoxide having at least two terminal groups of the formula,

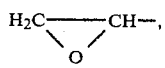

obtainable by reacting epichlorohydrin and a polyhydroxy phenol or an aliphatic diol or polyol, e.g. bisphenol A, glycerol, glycol, diethylene glycol, hexamethylene glycol and the like. Low molecular weight vinyl addition copolymers of glycidyl vinyl ether and of glycidyl (meth)acrylate may also be acrylated to form acrylated polyepoxides of component (2).

The relative proportions of components (1) and (2) may fall within a wide range depending upon the particular composition of each of the components. In general, the amount of unsaturated polyacrylate or polyacryloxy compound (component (2)) that is used is sufficient to react with primary or secondary amine groups of component (1) to result in crosslinking upon ambient or elevated-temperature cure to whatever extent is desired or needed to obtain the balance or combination of mechanical and resistance properties. The ratios of component (2) to component (1) advantageously may fall in the range of 0.5 to 3.5 equivalents of unsaturated acryloxy groups in component (2) per equivalent of amine nitrogen (primary and secondary total) in component (1). Preferably they are present in proportions having 1.5 to 2 acrylate unsaturation equivalents of component (2) for each equivalent of reactive hydrogen-containing amine in component (1).

Besides a content of primary and/or secondary amine groups and/or imine groups in component (1) there may also be other hydrophilic groups or linkages depending on the composition of the copolymer and the polyamine used in aminolysis and the procedure used in aminolysis. Thus the initial copolymer may contain hydroxyl or carboxyl groups (for optimum results, the equivalents of amine nitrogen in the copolymer should exceed the equivalents of carboxyl, if any, therein), the polyamine may contain two primary amine groups, one of which on aminolysis converts the acrylic ester linkage to an acrylic amide linkage in which the amide nitrogen carrier one unsubstituted hydrogen and an amino-containing substituent which may contain not only a terminal primary or secondary amino nitrogen, but also one or more intermediate secondary amino groups or even a pendant hydroxyl groups. In addition, a relatively small but significant amount of carboxyl groups may be introduced into the polymer if aminolysis is not carried out under essentially anhydrous conditions. Having some content of hydrophilic groups, as those mentioned may be desirable in the cured films and, to the extent they are felt to contribute desirable properties to the cured film, their presence may be tolerated or even favored by taking deliberate steps to introduce them.

Such hydrophilic groups may be particularly desirable when the coating system is to be dispersed or dissolved in aqueous media.

In a modified embodiment of the invention, a portion of the reactive amine content of the component (1) polymer may be reacted with a monoethylenically unsaturated compound of formula IV hereinafter, such as acrylonitrile, a acrylamide or a monoacrylate such as an alkyl acrylate. This may be carried out before the polyfunctional acrylate is mixed with the amine-containing polymer constituting component (1). Alternatively, part or all of the monofunctional unsaturated compound, such as mono acrylate, may be added to the polyfunctional acrylate of component (2) whereby such component (2) contains both a monofunctional unsaturated compound of formula IV below and polyfunctional acrylate which react simultaneously with the amino-containing component (1).

This use of a monofunctional unsaturated compound reduces the amount of reactive amine that is available for reaction with the polyfunctional unsaturated acrylate of component (2) and provides for greater versatility in producing products having a variety of desired properties in the coatings systems of the present invention, e.g. pot-life extension, coating gloss, hydrophobicity, coefficient of friction, surface contact angle, etc.

The general class of monofunctional unsaturated compounds that may be used to reduce the amount of active hydrogen on primary or secondary amine groups of the amine-containing polymer to be used as component (1) may be a compound of the general formula:

$$H_2C=C(R)-X \qquad (IV)$$

wherein R is H or CH$_3$, preferably being H, and

X is an electron-withdrawing group, such as a group selected from —CN, —CON(R$^2$)(R$^3$), and —COOR$^4$, R$^2$ being H or (C$_1$–C$_{20}$) alkyl, R$^3$ being H or (C$_1$–C$_{20}$) alkyl and R$^4$ being selected from (C$_1$–C$_{20}$) alkyl groups which may be substituted with halogen atoms, such as the specific compounds: a mixed (C$_{16}$–C$_{20}$) alcohol acrylate and hexafluoroisopropyl acrylate.

When a primary amine group in the polymeric component (1) takes on a single unsaturated compound of formula IV, the production of reaction product may be represented by the equation:

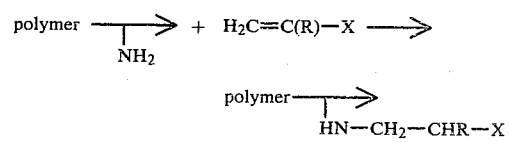

When the same addition occurs with a secondary amine group on the component (1) polymer, the active hydrogen on the secondary amine nitrogen is replaced by a group —CH$_2$—CHR—X and is no longer available for crosslinking by component (2). However, the amount of monofunctional compound of formula IV should not be so great as to eliminate so many of the active hydrogen atoms on primary or secondary amine nitrogen atoms as to preclude adequate addition of component (1) polymer across the double bonds of the polyfunctional component (2) to crosslink the composition to the extent necessary to provide the desired mechanical and resistance properties in the cured products. The same range of ratios of component (2) to component (1) (0.5 to 3.5 equivalents of unsaturated groups in component (2) per equivalent of amine (primary and secondary total) in component (1)) is applicable to the situation when component (2) contains both monofunctional and polyfunctional unsaturated compounds, provided that the latter compound supplies at least 0.5, and preferably 1.5 to 2 acryloxy unsaturation equivalents per equivalent of amine nitrogen in component (1). If part or all of the monofunctional unsaturated compound of formula IV is first reacted with the amine-containing component (1), the resulting reduction of reactive amine content in the component (1) polymer should be taken into consideration when subsequently determining the ratio used in reacting component (2) with component (1).

The component (2) not only serves to crosslink the composition but it may also be selected to alter the properties of the final cured product. This is especially true when one of the more "complex" polyfunctional acrylates, such as those mentioned in the paragraphs above-identified by the letters (A) through (M), is used in the composition. In addition, a monofunctional compound of formula IV may be selected with the intention to provide modified properties of the cured product. There may also be used as component (2) a mixture of two or more of the polyfunctional unsaturated acrylates, again for the purpose of crosslinking and also modifying the final mechanical, optical, and chemical resistance properties.

Component (2) may include a vinyl addition polymerization inhibitor, such as hydroquinone, in small amounts, such as 0.01 to 0.2%.

The compositions comprising the amine-containing polymer or polymers making up component (1) and the polyfunctional acryloxy crosslinking compounds constituting component (2) have room temperature pot stability falling in the range of about 15 minutes to several days depending on the particular amine-containing polymer(s) used for component (1) and the particular unsaturated polyacrylate(s) used therein. The imine-containing polymer has considerably longer stability. Therefore it is particularly appropriate to include the stabilizing ketone or aldehyde when the component (1) contains no imine groups. The stability of both amine and imine group-containing polymers can be enhanced by storage at temperatures below normal ambient temperatures, such as about 10° C. to less than −10° C. Similarly, the stability is generally extended in duration at any given temperature when an appreciable amount of a reaction retardant, such as a volatile ($C_3$ to $C_{10}$) ketone or aldehyde, e.g. acetone or butyraldehyde, is added to the composition containing both components (1) and (2) or when such composition is also diluted in effect by the addition of various materials needed to provide modifications of luster, color, and the like, such as fillers, pigments.

The volatile stabilizer that retards the reaction may be used in various amounts of about 0.5 to 80% by weight, based on the total weight of the two reactive components (1) and (2). However, the stabilizer may also serve as a part, or in some instances, as the entire vehicle or solvent medium for the coating compositions. Thus, acetone, cyclohexanone, methyl ethyl ketone, methyl butyl ketone, diethyl ketone, methyl hexyl ketone, benzaldehyde, or isobutyraldehyde, may be used in low quantities or proportions of about 0.5 to 3% by weight or even in larger quantities to serve as a component of the vehicle or as the entire solvent component of the vehicle.

The presence of a small amount of ketone or aldehyde as just described apparently is in equilibrium with primary amine groups in the aminolysis or amidation product used as component (1). Much greater stability is obtained when substantially all of the primary amine groups are converted by chemical reaction (and removal of liberated water) of these groups with any $C_3$-$C_{10}$ ketone, mentioned hereinabove, and especially ethyl amyl ketone and diisopropyl ketone. The use of ethyl amyl ketone and diisopropyl ketone is especially advantageous because these ketones apparently have little tendency to become involved in undesirable side-reactions. The compositions comprising, as component (1) thereof, the ketimine-containing polymers obtained as just described (wherein there are substantially no primary amine groups) or one of the polymers containing mers of the ketimine or aldimine monomers of U.S. Pat. Nos. 3,037,969 or 3,497,485 have extended pot-life in anhydrous conditions. They also provide hydrocurable compositions which are adapted to cure when exposed to ambient conditions of temperature and relative humidity (e.g. 20°–25° C. and 20 to 90% R.H.). Even with the "chemically combined" type of blocked amine, there may be included additional free ketone or aldehyde of the same constitution as that used in making the imine to serve as part of or all of the solvent.

The compositions of the present invention may be applied to form clear, protective, and decorative coating and/or impregnant films. However, they may also contain various additives other than those which react to form the crosslinked binder, body, or matrix of the film. Such additives may be plasticizers, such as dioctyl phthalate, pigments and inorganic fillers, such as glass, titanium dioxide, silica, barite, and calcium carbonate, coloring matter, such as dyestuffs, anticorrosive agents, and waterproofing or water-repellents, such as paraffin waxes.

The compositions may be formulated by mixing component (1) with component (2) and suitable solvents, dispersing agents, fillers, pigments and the like and storing the composition, if necessary, at low temperature, such as from about −10° C. to +10° C., until it is used at ambient temperatures. If, however, it is not to be used within a period of one to three days, it is more practical to make up the composition as a two-package system, one package containing component (1) and the other component (2) with polymerization inhibitor, optionally with a monofunctional compound of formula IV above. Suitable solvents may be present in either or both packages. Pigments, fillers, and the like may be included in one or the other of the packages or even part in one, and part in the other. Instead of including the monofunctional compound of formula IV in the second package containing component (2), such monofunctional compound (or compounds) may be included, optionally with a vinyl polymerization inhibitor in the first package so that it may have an opportunity to react with primary or secondary amine groups while in storage and/or during shipment of the two-package system to the point of use where they are mixed just prior to use.

After mixing the two packages in proper proportions, the resulting composition may be used for coating numerous substrates, such as those of metals, wood, glass, and plastics to produce thereon upon ambient curing, with or without acceleration thereof by heating, protective and/or decorative coating films which have an outstanding combination of properties, chemical resistance, rust-resistance, durability, e.g. to weathering, i.e. exposure to UV light, rain, etc., and hardness, toughness, flexibility, and other mechanical properties, including lubricity, frictional effects, etc. Also, the factors of low cost and toxicity involved in manufacture and use taken in conjunction with the properties obtainable on cure provide a versatility obtainable from the compositions of the present invention such that in many instances they may beneficially be used in place of other ambient curing systems heretofore used. The compositions may also be used as binders for fibrous webs to form bonded non-woven fabrics by impregnation of the webs and curing. Since the compositions of the present invention do not depend on air-curing, they are quite useful as adhesives to join sheets or panels of various materials, e.g. glass, metals, wood and plastics, such as those of polyesters (Mylar), polymethyl methacrylates (Plexiglas ®), cellophane, and the like.

In the following examples illustrative of the invention, the parts and percentages are by weight and the temperatures in Celsius degrees, unless otherwise specified. Also, the following abbreviations are used:

VT for vinyltoluene
MA for methyl acrylate
BMA for butyl methacrylate
EDA for ethylenediamine
$M_n$ for number average molecular weight
$M_w$ for weight average molecular weight
ME for milliequivalent
d.p. for degree of polymerization
t-BP for t-butyl peracetate
KHN for Knoop Hardness No. (obtained by Tukon tester)
R.H. for relative humidity
MIBK for methyl isobutyl ketone
MM for millimoles

EXAMPLE 1

(a) Preparation of Poly(VT/BMA/MA//34.1/41.0/24.9)

To 800.7 g of butyl Cellosolve (2-butoxyethanol), heated to 140° C. under a nitrogen atmosphere, and with rapid stirring is added a solution of 464.4 g of methyl acrylate, 766.8 g of butyl methacrylate, 637.2 g of vinyltoluene, and 80.07 g of 70% t-butyl peracetate over a period of 3 hours. The addition of the solution of monomers containing catalyst is made at a uniform rate of 630 g/hour.

When the addition is completed, the solution is held at a temperature of 140° C. for 1 hour and then cooled to 120° C. Then, 8.0 g of 70% t-BP is added and a temperature of 120° C. is maintained for ½ hour before cooling to room temperature.

The resulting clear, amber solution contains the copolymer of the three monomers in the percentages given in the heading at 69.4% solids and has a viscosity of 7300 cps as determined with a Brookfield viscometer at 25° C. using a #3 spindle at 12 rpm.

Gel permeation chromatography shows:
$\overline{M}_n = 3200$; $\overline{M}_w = 9300$ The calculated dispersity ($\overline{M}_w/\overline{M}_n$) is 3.10 and the d.p. (degree of polymerization) is 27.7.

(b) Amidation of the Copolymer Obtained in Part (a) with Ethylenediamine

A solution is prepared from 1500 g of the solution obtained in part (a), containing 258 g (3.0 moles) of polymerized methyl acrylate, and 121.6 g (2.03 moles) of ethylenediamine (EDA). Titration shows this solution to have an amine equivalence of 6.19 ME/g and the solution to contain a total of 3.850 equivalents of amine.

The solution is heated for 48 hours at 125° C. under a nitrogen atmosphere with stirring until the amine equivalence is 5.07 ME/g.

After cooling to 90° C., 300 g of butyl Cellosolve is added to the solution. Distillation under reduced pressure (90°–110° C./15 mm) removes 287 g of distillate. This procedure is repeated, 300 g of butyl Cellosolve added, and 362 g of distillate removed. Titration of the combined distillates shows a total of 3.06 equivalents of amine to be present. Ethylenediamine consumed by reaction with the polymer is 3.85–3.06=0.788 equivalents or 1.58 moles. Since the d.p. of the initial polymer is 27.7, of which 33.3 mole % is methyl acrylate, there are 9.24 methyl acrylate mers per average molecule initially. On the basis that reaction with ethylenediamine converts methyl acrylate units in the polymer backbone to N-2-aminoethylacrylamide units, then (1.58/3.00) (9.24)=4.86 of the latter units are formed per average molecule as a result of the amidation.

Gas chromatography indicates that the solution contains 1% residual ethylenediamine. A solution of 560 g of the amidation product is diluted with 400 g of butyl Cellosolve and 60 g of a strong-acid type of ion exchange resin is added to remove the excess amine. The mixture is warmed on a steam bath and stirred for 5 hours. Initially, before addition of the ion exchange resin, the amine titer was 0.491 ME/g and after removing the ion exchange resin by filtration the titer was 0.234 ME/g. This corresponds to the loss of 0.78% ethylenediamine. A gas chromatograph of the treated solution shows no ethylenediamine peak present.

The solids content of the treated solution is 34.1% and the amine equivalence based upon solids is 1.44 ME/g.

(c) Preparation of Coatings

An acrylated epoxidized soybean oil, such as that available commercially under the trade-mark designation ACTOMER ® X-80, with an acrylate equivalence of 2.8 ME/g and practically no reactive residual epoxy content is diluted to 50% solids with butyl Cellosolve.

The resin solution obtained in part (b) is divided into 30-g portions, each containing 14.73 ME of titratable amine. To each portion is added 2.0 g of acetone to retard the reaction with the acrylated epoxidized soybean oil.

Weighed amounts of the acrylated epoxidized soybean oil solution are then added to the resin containing solutions as indicated in Table I following:

TABLE I

| Substance | Coating Solution | | | | |
| --- | --- | --- | --- | --- | --- |
| | A | B | C | D | E |
| grams amine resin | 30 | 30 | 30 | 30 | 30 |
| ME amine | 14.73 | 14.73 | 14.73 | 14.73 | 14.73 |
| grams acrylate sol. | 10.52 | 13.15 | 16.31 | 18.41 | 21.04 |
| ME acrylate | 14.73 | 18.41 | 22.83 | 25.78 | 29.46 |
| acrylate/amine | 1.00 | 1.25 | 1.55 | 1.75 | 2.00 |

TABLE I-continued

| Substance | Coating Solution | | | | |
|---|---|---|---|---|---|
| | A | B | C | D | E |
| acetone added (g) | 2.0 | 2.0 | 2.0 | 2.0 | 2.0 |

After tumble mixing for 20 min. the solutions are coated on Bonderite® 1000 steel panels with a 7 mil knife and then placed in a room at 70° F. and 50% R.H. to dry. After three weeks in such ambient conditions of drying or curing, determination of KHN of the first set of five samples is made on a Tukon hardness tester, then all of the samples are subjected to a baking for 24 hours at 140° F. and the KHN of the same set of five samples is determined to provide a comparison of hardness obtained after 3 weeks of ambient cure without subsequent baking and the hardness obtained when the 3 week ambient cure is followed by the 24 hour baking. The rest of the results tabulated are those obtained on coatings having 3 weeks of the room temperature cure followed immediately with a 24 hour bake at 140° F. TABLE II shows the properties determined.

TABLE II

| Property | Coating | | | | |
|---|---|---|---|---|---|
| | A | B | C | D | E |
| KHN (before baking) | 12.5 | 10.4 | 7.5 | 6.2 | 4.2 |
| KHN (after baking) | 12.9 | 12.6 | 10.3 | 10.2 | 9.3 |
| Reverse Impact (in.-lb.) | 2 | 22 | 28 | 25 | 30 |
| Mandrel Bend (in.) | <⅛" diameter (all passed) | | | | |
| QCT*; 150° F./100 hr. | No change in appearance | | | | |
| Print resist** 140° F./4 hr | 10 | 9 | 8 | 6 | 10 |
| Xenon Arc W 2000 hr. | No change in appearance | | | | |
| Chemical Resistance (15-min. patch***tests) | | | | | |
| 10% HCl | 3 | 3 | 4 | 4 | 4 |
| 10% Acetic Acid | 2 | 3 | 4 | 4 | 4 |
| Acetone | 3 | 3 | 3 | 3 | 2 |
| Methanol | 2 | 3 | 3 | 2 | 2 |
| Toluene | 3 | 3 | 3 | 2 | 2 |
| Gasoline | 3 | 3 | 3 | 3 | 3 |
| 10% NaOH | 4 | 4 | 4 | 4 | 4 |

*High humidity, variable temperature testing unit (Trade name QCT)
**Scale of 0 to 10; 0 is worst (heavy pattern), 10 is best (no pattern)
***Patch test-a ⅛" × ⅛" piece of 4-ply cheesecloth is placed upon the coated panel, saturated with the reagent, and covered with a bottle cap (1" diam. × ½" ht.) for various lengths of time, usually 15 min. to 60 min. depending on the severity of exposure used in relative comparisons.
Ratings-
4-no noticeable softening or change in appearance
3-slight softening
2-significant softening and/or slight hazing
1-delamination, solution, or whitening

EXAMPLE 2

(a) Preparation of Poly(VT/MA//73.3/26.7)

Using the procedure following in Example 1(a) with a monomer mixture consisting of 1099 g of vinyl toluene and 401 g methyl acrylate with 21.4 g of 70% t-BP and adding this solution to 643 g of butyl Cellosolve at 140° C., a polymer with $\overline{M}_n$ 11,700, $\overline{M}_w$ 30,500, and a calculated d.p. of 109 is obtained.

(b) Amidation of Copolymer of (a) above

To 500 g of the copolymer solution of part (a) in 200 g of butyl Cellosolve is added 99.8 g of ethylenediamine. The solution is heated for 40 hours at 136° C. by a procedure similar to that used in Example 1(b). After twice adding and vacuum distilling butyl Cellosolve, a resin solution containing 41.7% resin solids with an amine titer of 2.25 ME/g based upon solids, is obtained.

(c) Preparation of Coatings

Solutions are prepared for coating as indicated in TABLE III following the same procedure as in Ex. 1(c) except the amine-containing polymer solution obtained in part (b) hereof is used:

TABLE III

| Ingredients | Coating Solution | | | | |
|---|---|---|---|---|---|
| | F | G | H | I | J |
| g of amine polymer | 25 | 25 | 25 | 25 | 25 |
| ME amine 23.23 | 23.23 | 23.23 | 23.23 | 23.23 | 23.23 |
| g of acrylate sol.* | 16.6 | 20.75 | 24.9 | 29.1 | 33.2 |
| ME acrylate | 23.23 | 29.10 | 34.9 | 40.75 | 46.50 |
| Acrylate/amine | 1.00 | 1.25 | 1.50 | 1.75 | 2.00 |
| Acetone | 2.0 | 2.0 | 2.0 | 2.0 | 2.0 |

*50% solution in butyl Cellosolve of the acrylated epoxidized soybean oil as used in Example 1c).

After tumble mixing the coating compositions for 20 mins., the solutions are applied to steel test panels as described in Ex. 1(c) and placed in a room at 70° F. and 50% R.H. to dry and cure. Various of the test panels are dried and cured in the controlled (ambient) room for different periods of time (2 days to 30 days) and in some instances the ambient cure is followed by baking at 140° F. for 24 hours as indicated in the following TABLE IV listing coating properties obtained on testing the test panels after completion of the cure. The table shows the range obtained with two tests.

TABLE IV

| | Properties of Coatings | | | | | | |
|---|---|---|---|---|---|---|---|
| | Ambient | | Coating | | | | |
| | Cure Days | Bake | F | G | H | J | K |
| Property | | | | | | | |
| KHN | 2 | No | 5.87 | 4.80 | 3.61 | 2.85 | 2.51 |
| KHN | 10 | No | 11.2 | 8.70 | 8.05 | 6.29 | 3.79 |
| KHN | 36 | No | 11.9 | 11.0 | 9.54 | 8.30 | 5.28 |
| KHN | 21 | Yes | 10.3 | 9.83 | 8.47 | 5.93 | 4.54 |
| Mandrel Bend (in.) | 10 | No | <⅛" diameter (all samples passed) | | | | |
| Rev. Impact (in-lb) | 21 | Yes | >75, <100 | 100± | >100, <125 | >100, <120 | >100, <120 |
| Chem. Res. (15 min. patch tests except*) | | | | | | | |
| 10% acetic acid* | 12 | No | 1 | 1 | 2 | 3 | 3 |
| 10% acetic acid* | 30 | No | 1 | 1 | 3 | 3 | 4 |
| Methanol | 30 | No | 3 | 3 | 3 | 3 | 3 |
| Acetone | 30 | No | 3 | 3 | 3 | 3 | 3 |

TABLE IV-continued

| | Properties of Coatings | | | | | | |
|---|---|---|---|---|---|---|---|
| | Ambient | | Coating | | | | |
| | Cure Days | Bake | F | G | H | J | K |
| Toluene | 30 | No | 3 | 3 | 3 | 3 | 3 |
| Gasoline | 30 | No | 3 | 3 | 3 | 3 | 3 |
| 10% NaOH | 30 | No | — | — | — | — | 4 |

*30 min. patch test

EXAMPLE 3—CHEMICAL BLOCKING WITH ACETONE (a) Acetone Imine

To 270 g of 34.1% solution of the amine-containing polymer obtained in Ex. 1(b), there is added 75 g of reagent grade acetone and 50 g of Davison ® number 4A molecular sieves to withdraw moisture; the mixture is heated and refluxed 2 hours with stirring under a nitrogen atomsphere. After cooling, the mixture is filtered and stored in a dried bottle. Titration shows an amine equivalence of 0.387 ME/g.

(b) A 50% solution is prepared by dissolving 400 g of Actomer ® X-80 in 400 g of distilled butyl Cellosolve. The solution is dried by adding 40 g of Davison ® 4A molecular sieves and stirring at room temperature for 4 hours. The sieves are removed by filtration and the solution is stored in a dried bottle. The acrylate equivalence is 1.40 ME/g.

(c) Pot-Life Comparisons

To 100 g of anhydrous acetone imine of part (a) hereof there is added 35.1 g of the dried Actomer ® X-80 solution in butyl Cellosolve obtained in part (b) hereof and the resulting solution is stored in a bottle which had been previously dried at 125° C. to remove traces of moisture. This solution is designated 3A.

A 50-g portion of the 3A solution is transferred to a second bottle and 0.50 g (1.0%) water is added with rapid stirring. This solution is designated 3B.

On standing at room temperature (~23° C.) solution 3B gels in 50 minutes while solution 3A remains fluid for 2 days and gradually increases in viscosity to the point of gelation at 4 days.

(d) Coatings from an Acetone Imine Blocked Resin System

Coatings are prepared as follows:

| Coating Solutions: | L | M | N |
|---|---|---|---|
| grams of acetone imine of part (a) | 43.32 | 43.32 | 43.32 |
| ME amine | 16.76 | 16.76 | 16.76 |
| grams 50% Actomer X-80 solution obtained in part (b) | 15.78 | — | 3.29 |
| grams, trimethylolpropane triacrylate (TMPTA) | — | 2.08 | 1.64 |
| ME, Actomer X-80 (1.40 ME/g) | 22.09 | — | 4.61 |
| ME, TMPA (10.63 ME/g) | — | 22.11 | 17.43 |
| ME, total acrylate | 22.09 | 22.11 | 22.04 |
| Acrylate/amine ratio | 1.32 | 1.32 | 1.32 |

After tumble mixing for 20 min. the solutions are coated on Bonderite ® 1000 steel panels with a 7-mil film spreader and then cured at 70° F./50% RH. At the times indicated in the following TABLE V, the properties are determined:

TABLE V

| | Cure | Bake | Coating | | |
|---|---|---|---|---|---|
| | | | L | M | N |
| KHN | 3 wks | none | 8.64 | 14.2 | 12.8 |
| KHN | 70° F./50% RH 3 wks | 140° F./24 hr | 12.9 | 18.0 | 16.2 |
| Reverse Impact (in.-lb.) | 70° F./50% RH 3 wks | 140° F./24 hr | 24 | <2 | <2 |
| Mandrel Bend (in.) | 70° F./50% RH 3 wks | 140° F./24 hr | <⅛ | >½ | >½ |
| QCT 150° F./100 hr | 70° F./50% RH 3 wks | 140° F./24 hr | No change in appear. | | |
| Print Resist 140° F./4 hr. | 70° F./50% RH 3 wks | 140° F./24 hr | 8 | 10 | 8 |
| Xenon Arc W | 70° F./50% RH 3 wks | 140° F./24 hr | >2000 hr. | partial delamination | 1500 hr. |

| | Coating | | |
|---|---|---|---|
| | L | M | N |
| Chemical Resistance (3 wks ambient curing plus 140° F./24 hr) (15-min patch tests) | | | |
| 10% HCl | 3 | 1 | 1 |
| 10% Acetic acid | 3 | 1 | 1 |
| Acetone | 3 | 3 | 3 |
| Methanol | 3 | 2 | 2 |
| Toluene | 3 | 1 | 1 |
| Gasoline | 3 | 4 | 4 |
| 10% NaOH | 4 | 4 | 4 |

EXAMPLE 4—CHEMICAL BLOCKING WITH MIBK/TOLUENE AZEOTROPE (a) Ketimine-containing Polymer To 283 g of an EDA aminolysis product (having 2.42 ME/g amine titer) of a copolymer of 67.3% VT and 32.7% MA having a $\overline{M}_n$ of 3000 is added 150 g of toluene and 150 g of methyl isobutyl ketone. The resulting solution is heated at reflux in a flask equipped with a stirrer, condenser, and a Dean-Stark trap to separate water formed by the reaction of amine with ketone and under a nitrogen atmosphere. After refluxing 2 hours, 14.1 g of water has collected in the trap (theory 12.3). The resin solution is then stripped under vacuum until the solids content of the resin solution is 44.0% solids. Titration in the presence of water shows the solution contains 2.10 ME/g of amine.

(b) Coating

A clear coating is prepared from the ketimine-containing polymer obtained in part (a) as follows

| Imine blocked polymer of part (a) | 46.1 g |
|---|---|
| Actomer ® X-80 | 25.0 |
| Butyl Cellosolve | 2.2 |
| Xylene | 28.0 |

| | |
|---|---|
| Methyl isobutyl ketone | 28.0 |

The initial solution shows a Gardner-Holdt viscosity of A-1 and after 7 hours at ambient temperature a viscosity of D+. A similar formulation using the unblocked aminolysis product starting material of part (a) shows a viscosity of Y two hours after mixing and gels at 2.5 hours.

Coatings of the blocked resin system on Bonderite ® 1000 steel panels are glossy and after 7 days at ambient temperature show a KHN of 4, resistance to 10% acetic acid of greater than 30 minutes, and resistance to organic solvent and 10% aqueous sodium hydroxide solution.

EXAMPLE 5—PREREACTION OF AMIDATED RESINS WITH MONOFUNCTIONAL ACRYLATES AND THEN PREPARING COATINGS WITH POLYACRYLATES

The EDA amidation product of Ex. 1(b) is mixed in separate containers with various monofunctional acrylic monomers as follows:
A. Methyl acrylate (MA)
B. Acrylic acid ester of a mixture of ($C_{16}$–$C_{20}$) alcohols (CEA)
C. Hexafluoroisopropyl acrylate (HFIPA)

The relative proportions of the respective components of the several mixtures are such as to provide, for each amine nitrogen ME of the amidation product, from about 0.25 to 1.25 ME of unsaturate in the MA, from about 0.25 to about 0.50 ME in the CEA, and from about 0.5 to about 1.0 ME in the HFIPA. The solutions are allowed to react at room temperature for four days and the resulting solutions may be provided with about 7% to 12% by weight of a ketone, e.g. acetone. Then a 50% solution of Actomer X-80 is mixed with each of the prereacted polymers to provide clear coating solutions having various ratios of the ME of the Actomer X-80 and ME of amine nitrogen (efore prereaction) ranging from 0.75 to 2.0. Such coatings can be applied as described in the previous examples.

EXAMPLE 6

(a) A poligomer is prepared by adding a solution containing 177.5 g of the methyl isobutyl ketimine of 2-aminoethyl methacrylate of U.S. Pat. No. 3,037,969 (Ex. 2), 265.5 g of methyl methacrylate, and 19.0 g of 70% t-BP to 190 g of butyl Cellosolve while maintaining the mixture at a temperature of 130° C. over a period of 5 hours. When the addition is complete, an additional charge of 1.9 g of 70% t-BP is added to the solution and heating at 130° C. is continued for 0.5 hours before cooling.

The resulting polymer solution has the following properties:

| | |
|---|---|
| Viscosity Brookfield, #4 spindle at 3 RPM; 25° C. | 120, 800 cps. |
| Amine titer | 0.88 ME/g |
| Solids | 68.1% |
| $\overline{M}_w$, GPC | 69,300 |
| $\overline{M}_n$, GPC | 13,500 |
| Calc'd dp | 100.4 |

(b) A second poligomer is prepared by the method described in part (a) by adding a solution containing 177.5 g of the methyl isobutyl ketimine of 2-aminoethyl methacrylate, 49.5 g of methyl methacrylate, 224.6 g of styrene and 19.35 g of 70% t-BP to 194 g of butyl Cellosolve maintained at a temperature of 140° C. over a period of 5 hours. An additional charge of 1.9 g of 70% t-BP is then added to the batch and heating at 140° C. continued for 0.5 hours before cooling.

The resulting resin solution has the following properties

| | |
|---|---|
| Viscosity, Brookfield, #4 spindle at 6 RPM, 25° C. | 45,200 cps |
| Amine titer | 1.17 ME/g |
| Solids | 64.7% |
| $\overline{M}_w$ (GPC) | 17,100 |
| $\overline{M}_n$ (GPC) | 5,620 |
| Calc'd dp | 43.5 |

(c) These imine polyigomers are formulated with Actomer X-80 at a 1.0/1.3 amine/acrylate ratio in three solvent systems, butyl Cellosolve, 1 butyl Cellosolve/1 MIBK, and 1 butyl Cellosolve/1 xylene/1 MIBK (weight ratios).

All six samples exhibit gel times greater than 8 hours. 7-day ambient-cure samples, in all cases, are soft (KHN's between 0.5 and 3.00), flexible and display excellent impact strength. Solvent and acid resistance are poor. All are swelled but not dissolved by methylene chloride. 7-day bake (140° F.) samples of coatings made using the polymer of part (a) has good hardness and good resistance to acid (30 min. 10% HAc) with acceptable solvent resistance. 7-day bake (140° F.) samples of coatings made with the poligomer of part (b) do not show any better acid and solvent resistance properties than the ambient-cure samples.

EXAMPLE 7—POLIGOMER (a) A poligomer containing styrene and methyl acrylate at a 1:1 mole ratio is prepared at 77% solids in butyl Cellosolve at 140° C. with 70% t-BP catalyst by the method described above. Properties of the resulting polymer solution are:

| | |
|---|---|
| Solids | 77.2% |
| $\overline{M}_w$ (GPC) | 8880 |
| $\overline{M}_n$ (GPC) | 3170 |
| Appearance | clear, water-white |

(b) Amidation with EDA

To 1168 g of the above polymer solution there is added 100 g of butyl Cellosolve and 629 g of ethylenediamine. After heating for 33.25 hours in the temperature range of 115°–130° C., vacuum stripping to remove unreacted ethylenediamine, and diluting with butyl Cellosolve, a resin solution with the following properties is obtained:

| | |
|---|---|
| Solids | 50.9% |
| Amine titer | 3.36 ME/g |
| Viscosity; Brookfield | 78,000 cps |
| Appearance | clear, light amber |

| | |
|---|---|
| Acid titer | 0.82 ME/g |

(c) Amidation with 1,3-propylenediamine

To 982.7 g of the polymer solution obtained in part (a) there is added 100 g of butyl Cellosolve and 653.8 g of 1,3-propylenediamine. This solution is heated for 23.0 hours at 125°–130° C., vacuum stripped to remove unreacted diamine, and diluted with butyl Cellosolve to yield a resin solution with the following properties:

| | |
|---|---|
| Solids | 50.9% |
| Amine titer | 2.52 ME/g |
| Viscosity, Brookfield | 234,000 cps. |
| Appearance | clear, pale yellow |
| Acid titer | 0.33 ME/g |

(d) Coatings

Coating solutions are prepared by mixing

| Amidated Resin | Actomer X-80* | Acetone | Butyl Cellosolved |
|---|---|---|---|
| 10 g (part (b)) | 9.32 g | 2 g | 3.1 g |
| 10 g (part (c)) | 6.98 g | 2 g | 4.3 g |

*50% solution in butyl Cellosolve

After mixing for 5 minutes, the solutions are each applied to Bonderite 1000 steel panels as a 6-mil wet film. After curing under ambient conditions for three days neither of the coatings shown any delamination, but both show moderate softening when exposed to 10% acetic acid solution for 15 minutes. When exposed to liquid methylene chloride for 15 min. the coating from the resin of part (b) swells and delaminates from the substrate indicating a crosslinked polymer network to be present. The coating from the resin of part (c) is unusually resistant to this solvent and shows no signs of swelling or delamination indicating the formation of a highly crosslinked polymer network.

EXAMPLE 8—ACRYLATE/AMINE COATING SYSTEM CONTAINING A VOLATILE ACID AS A BLOCKING AGENT

To 10 g samples of an ethyelendiamine-amidated copolymer of styrene and MA in 1.5 to 1 mole ratio there is added 2.5 g of phenoxyethanol and glacial acetic acid (HAc) in the following amounts:

| Samples | Equiv HAc/Equiv Resin | g HAc/g Resin |
|---|---|---|
| A | 1.0/1.0 | 0.33/10 |
| B | 1.5/1.0 | 0.50/10 |
| C | 2.0/1.0 | 0.66/10 |
| D | 3.0/1.0 | 1.0/10 |
| E | 0/1.0 | 0/10 |

After mixing thoroughly, 5.9 g of a 50% solution of Actomer X-80 dissolved in butyl Cellosolve is added to each solution (A thru E). The solutions are shaken until homogeneous, coated on Bonderite 1000 steel panels, and gelation times are determined on the solutions as follows:

| Samples | Gelation Time (hours) |
|---|---|
| A | 8 |
| B | 18 |
| C | 24 |
| D | 36 |
| E | 0.25 |

After curing for 3 weeks under ambient conditions all of the coatings on the panels are hard, clear, tough, rust-free, and show virtually identical resistance to methylene chloride and 10% acetic acid solution.

EXAMPLE 9—PARTIAL BLOCKING OF AN AMIDATED RESIN BY PREREACTION WITH A MONOACRYLATE

To 10 g of the same EDA-amidated styrene/MA copolymer used in Ex. 8, there is added 4.65 g of isobornyl acrylate (IBA) and the resulting solution is allowed to stand at room temperature for 4 days. During this time the viscosity increases. Then, 3.99 g of a 50% solution of Actomer X-80 dissolved in butyl Cellosolve, together with 2 g of butyl Cellosolve and 4 g of acetone, are added to this solution. Pot-life is extended by the prereaction of the IBA with the amine-containing polymer.

A coating prepared on a Bonderite 1000 panel dries tack-free overnight at ambient temperature. The film is glossy and exposure to 10% acetic acid solution for ½ hr. shows only slight softening. Exposure to methylene chloride swells the film, indicating a crosslinked network.

The coating solution gels after standing about 2 weeks at ambient temperature.

EXAMPLE 10—CHEMICAL BLOCKING WITH CYCLOHEXANONE USING CYCLOHEXANE AS SOLVENT (a) To 200 g of a butyl Cellosolve solution of the EDA-amidated 1.5:1 mole ratio Styrene/MA copolymer used in Ex. 8 is added 100 g of cyclohexanone and 200 g of cyclohexane. The resulting solution is heated at reflux in a flask equipped with a Dean-Stark trap to collect water formed. When the evolution of water is complete excess cyclohexanone and cyclohexane solvent are removed by distillation under reduced pressure and then butyl Cellosolve is added to the polymer to yield a solution thereof with the properties:

| | |
|---|---|
| Viscosity | Z |
| Solids | 26.9% |
| Amine titer | 1.43 ME/g (solids) |
| Color | light amber |

(b) In a similar manner EDA-amidated starting copolymer of part (a) hereof is reacted with MIBK to block the NH$_2$ groups with the MIBK ketimine using cyclohexane to azeotropically distill water formed. Physical properties are:

| | |
|---|---|
| Viscosity, GH, 25° C. | Z1+ |
| Solids | 35.8% |
| Amine titer | 1.90 ME/g (solids) |
| Color | light amber |

(c) Coatings are prepared by mixing the ketimines of parts (a) and (b) with acrylated epoxidized soybean oil, such as Actomer X-80 at an amine/acrylate ratio of 1.0/1.3 in butyl Cellosolve/xylene (2/1).

Ambient-cured coatings on test panels are soft, with excellent flexibility and impact strength. The coatings display acceptable acid and solvent resistance. The coating is swelled but not dissolved by methylene chloride.

EXAMPLE 11—BENZALDEHYDE IMINE BLOCK

To a solution of 250 g of an EDA-amidated copolymer (styrene/MA//2/1 mole ratio) which had been treated with a strong acid ion exchange resin to remove residual EDA, there is added 100 g of toluene and 59.1 g of benzaldehyde. The resulting solution is heated at reflux for 1.5 hrs. using a Dean-Stark trap to collect water formed. By this time 3.5 ml of water is collected and the formation of water stops. Initially, 558 ME of resin is charged, based upon a titer of 2.23 ME/g for the starting amidated copolymer, together with 558 MM of benzaldehyde. On the basis that all of the initial amine titer is primary amine, the water formed (194 MM) calculates as 34.8% conversion to imine.

The solution is then stripped of residual benzaldehyde and toluene under reduced pressure (300 g of distillate collected), cooled, and then diluted with 50 g of xylene.

| Appearance | clear, reddish amber |
|---|---|
| Amine titer | 1.90 ME/g (solids) |
| Solids | 41.1% |

Coating compositions are formed by mixing this solution with Actomer X-80 at three amine/acrylate stoichiometries:100, 75 and 50 percent in butyl Cellosolve.

7-day ambient-cure results indicate that these samples are slightly crosslinked. Coatings obtained are of medium hardness but display little resistance to reverse impact (~2 in.-lb.). They are heavily blistered and disintegrated by acid (30 min. 10% HAc). Solvent resistance is acceptable or poor at the high and low stoichiometries, respectively. The coating is swelled but not dissolved by methylene chloride.

7-day bake (140° F.) results on these coatings show that they are crosslinked sufficiently to give hard, flexible coatings with excellent impact resistance in addition to fair resistance to acid (4H pencil→H pencil) and solvents.

EXAMPLE 12

(a) A coating composition prepared by mixing (1) an EDA-aminolysis product (having 2.42 ME/g amine titer) of a copolymer of 67.3 g weight percent vinyltoluene and 32.7 weight percent methyl acrylate, the copolymer having a number average molecular weight of 3000, and (2) an acrylic acid adduct of an epoxidized linseed oil containing an average of about 2.2 epoxy groups per molecule, substantially all of such groups being reacted with acrylic acid to form a polyacryloxy compound having an average of at least 2 unsaturated acryloxy groups therein, with (3) butyl Cellosolve as the solvent, the proportions of (1) and (2) providing an amine/acrylate equivalent ratio of 1.0/1.3.

The coating composition is applied to Bonderite 1000 steel panels by brushing, dripping or spraying and cured 7 days at ambient temperature.

(b) Another coating composition is prepared as described in part (a) of this example except component (2) is replaced by an acrylic acid adduct of epoxidized soybean oil, again containing at least 2 unsaturated acryloxy groups therein. Actomer X-80 or other similar commercially available product may be used. The amine/acrylate equivalent ratio is the same as in part (a).

(c) A third coating composition is prepared as described in part (a) hereof except that component (2) is replaced by an acrylated urethane polyester oligomer. A commercially available product of this type may be used, such as Uvithane® 783, containing at least 2 unsaturated acryloxy groups. The same amine/acrylate ratio of 1.0/1.3 equivalents is employed.

(d) A fourth coating composition is prepared that is the same as that in part (a) but the second component is replaced by a poly (200) ethylene glycol diacrylate, an example of which that is commercially available being sold under the trade designation SR-259.

(e) A fifth coating composition is prepared like that in part (a) hereof in all respects except that component (2) of that composition is replaced by a diacrylate ester of a liquid bisphenol A epoxy resin. A commercially available product of this type is Epocryl® DRH-370.

Coatings of each of the compositions prepared in (b), (c), (d) and (e) are applied and allowed to cure 7 days at ambient temperature. If desired, the ambient cure may be supplemented, or replaced by a baking cure at elevated temperatures. However, the general properties obtained from the several coatings systems of parts (a) through (e) hereof may be summarized as in TABLE VI.

TABLE VI

| System | 7 Day Ambient Cure Properties |
|---|---|
| A+B | relatively soft, flexible coatings with excellent impact strength, acid and solvent resistance |
| C | soft, flexible coatings with excellent impact strength, poor acid resistance, but good resistance to solvents, e.g., gasoline and xylene |
| D | moderately hard, flexible coatings with excellent impact strength, no resistance to acid, but good solvent resistance |
| E | very hard, flexible coatings with excellent impact strength, very good acid resistance and excellent solvent resistance. |

EXAMPLE 13

(a) Polymer 55 MMA/20 BMA/25 Styrene; dp 19

A 5-liter, 4-necked flask equipped with a thermometer, mechanical stirrer, nitrogen sparge, Friedrich condenser, 2000 ml pressure-equalizing addition funnel and "Thermowatch" utilized with a pot lifter and heating mantle is charged with 500 g of butyl Cellosolve. The flask is heated, under nitrogen, to 150° C. and to it then is slowly added a mixture of 1100 g methyl methacrylate (11.0 moles), 400 g of butyl methacrylate (2.82 moles), 500 g of styrene (4.81 moles), 80 g of Lupersol 70 (75% t-butyl peracetate in mineral spirits; 3% on monomers), and 20 g of 2-hydroxyethyl mercaptan (1% on monomer) over a period of 9.25 hours. The resulting product is stirred 0.25 hours longer at 150° C. whereupon 8.0 g of Lupersol 70 is gradually added over a period of 0.25 hours and the mixture is then held 1.0 hour longer at temperature to complete residual monomer chase. Product specifications: $\overline{M}_w$=4340; $\overline{M}_n$=2040; $\overline{M}_w/\overline{M}_n$=2.13; 80% solids in butyl Cellosolve.

(b) Amidated Resin

A 2-liter, 4-necked flask equipped with a thermometer, mechanical stirrer, nitrogen sparge, variable takeoff distillation head, and "Thermowatch" utilized with a pot lifter and heating mantle is charged with 484.4 g of the oligomer obtained in part A (0.19 mole, 80% solids in butyl Cellosolve), 79.8 g of diethylenetriamine (0.77 mole), and 103.4 g of xylene. The mixture is heated at 145° C., under nitrogen, for 14.5 hours at which point the residual amine titer is 62.4% of initial charge. Temperature is maintained by the continuous removal of solvent and by-products (methanol, butanol) during the course of the reaction. To the flask is then added sufficient deionized water to remove residual xylene by azeotropic distillation and reduce product solids to 60%. The resulting acrylic polyamine has an amido functionality of 4.1 and is recovered as a clear, light amber solution with the following specifications:

| | |
|---|---|
| Solids: 61.9% in butyl Cellolsolve/water | (36:64) |
| Viscosity, spindle 4, 0.6 RPM; 25° C. | 518,000 cps. |
| Amine Equivalent Weight | 483 |
| Acid Number | 34.2 |
| Total Titer | 2.68 meq/g |

(c) Coating with Trimethylolpropane Triacrylate

To 20.0 g of amidated resin solution is added 4.7 g of acetone, 5.0 g of butyl Cellosolve, and 7.8 g of a 50% solution of trimethylolpropane triacrylate. After mixing for 10 minutes the solution is coated as a 6-mil wet film on Bonderite 1000 panels. After curing one week under ambient conditions the coating shows a KHN of 6.4 and a pencil hardness of 3H. The coating is swelled, but insoluble, in methylene chloride. Patch tests (15 min) show that the coating has good resistance to vinegar, lemon juice, toluene, acetone, methanol, and 10% sodium hydroxide solution.

EXAMPLE 14

(a) Resin

A 3 liter, four-necked, round-bottomed flask equipped with a mechanical stirrer, a thermometer, a "Thermowatch", an oil batch utilized with a pot lifter, a pressure-equalizing addition funnel and a variable takeoff distillation head protected with a Dewar condenser, is charged with 250 g of butyl Cellosolve. The system is sparged with nitrogen and heated to 150° C. To the flask is then added a solution of 250 g BMA (1.76 moles), 750 g MMA (7.5 moles), 10 g mercaptoethanol (0.13 mole), and 40 g of 75% t-butyl peracetate (Lupersol ® 70), under a nitrogen sparge, over a period of 9.75 hours. The rate of addition is such as to prevent excessive monomer reflux at 140°–150° C. Fifteen minutes after the completion of the feed, 4.0 g of 75% t-butyl peracetate (Lupersol 70) is added slowly to the flask to "chase" (i.e., to complete) the reaction of residual monomer. The reaction mixture is maintained at 150° C. for fifteen minutes longer, then diluted with 140 g of xylene and cooled to ambient temperature to give 1433 g of product as a clear, light yellow solution at 73.4% solids in butyl Cellosolve (64%)/xylene (36%). According to a gel permeation chromatographic test, the $\overline{M}_w$ of the oligomer is 7620 and the $\overline{M}_n$ is 2650 ($\overline{M}_w/\overline{M}_n$ is 2.88).

(b) Amidated Resin

The amidation procedure of Example 1 (b) is repeated with 500.0 g (3.4 mol, 73.4% solids in BC/xylene/64/36) of the oligomer prepared in part (a) hereof, 52.5 g (0.51 mol) of diethylenetriamine, and 100 g of xylene to provide a product with the following specifications (and having an amide-functionality of product 3.5):

| | |
|---|---|
| Solids (125° C./1 hr) | 43.5% |
| Viscosity (Brookfield, Spindle 4 at 0.6 RPM and 25° C.) | 555,000 cps |
| Amine Equivalent Number | 870 |
| Acid Number | 11.8 |
| Total Titer | 1.36 meq/g |

(c) Coating

To 11.49 g of resin solution obtained in part (b) there is added 2.48 g of a 50% solution of trimethylolpropane triacrylate dissolved in butyl Cellosolve. After mixing for 10 minutes the solution is coated on Bonderite 1000 as a 7-mil wet film. Curing 1 week at ambient temperature yields a coating with a KHN of 8.9 and a pencil hardness of 3H which is insoluble in methylene chloride and resistant to 15 minutes exposure to lemon juice, toluene, acetone, methanol, and 10% sodium hydroxide solution.

EXAMPLE 15

(a) Amidated Resin

A mixture of 608.8 g of the cooligomer of 75 parts methyl methacrylate/25 parts butyl methacrylate obtained in part (a) of Ex. 14, 105.1 g of di(3-aminopropyl)amine and 44 g of butyl Cellosolve is heated at 135°–140° C. for 15 hours and at 145°–150° C. for two hours. To maintain reaction temperature, distillation is allowed to proceed; to control viscosity, 100 g of xylene is added to replace solvent lost by distillation. The mixture is then cooled to 80° C. and 500 ml of water is added with stirring. The polyamine produced has 41.3% solids, a titer of 1.43 meq/g and a calculated amido functionality of 2.4.

(b) Coating

To 35.0 g of amidated resin obtained in part (a) there is added 5.09 g of xylene and 5.44 g of trimethylolpropane triacrylate. The solution is cast as a 6-mil wet film on Bonderite 1000 immediately after mixing. The coating is tack-free after 24 hr. ambient curing and has a KHN of 1.32 which increases to 4.23 after one week. The film is insoluble in methylene chloride when cured 1 week at ambient temperature.

EXAMPLE 16

(a) Oligomeric methyl acrylate with $\overline{M}_w$ of 1500 and $\overline{M}_n$ of 800 is prepared as follows: A slurry of 53.8 g of potassium tertiary butoxide in 400 g of toluene is stirred in a nitrogen atmosphere in a 3 liter, 3-necked flask equipped with stirrer, thermometer, condenser, and dropping funnel. A total of 2066 g of methyl acrylate (MA) is added over two hours while external cooling is used to maintain a 70° C. reaction temperature. After an additional 4 hours at 70° C., 25.6 g of concentrated sulfuric acid is added. Toluene and unreacted methyl acrylate are then removed at reduced pressure. Conversion of methyl acrylate to the oligomer characterized with $\overline{M}_n$ of 800 is 87%.

(b) Then, 516 g of this methyl acrylate oligomer and 468.8 g of ethylenediamine are heated in a stirred flask equipped for distillation. An initial amine titer of 16 meq/g (in acetone/water, 1/1), is observed. The mixture is then heated until methanol refluxes vigorously; distillation of methanol is then allowed at a reaction temperature of 110° C. After 12 hours, 126 g of methanol is collected. The pressure is reduced and ethylenediamine is distilled, finally as a codistillate with water. A total of 107 g of ethylenediamine is recovered. The reaction mixture is diluted with water to 73.2% solids and this solution has a titer of 7.31 meq/g.

(c) To 78.3 g of a 50% solution of acrylated epoxidized soybean oil (e.g. Actomer X-80) dissolved in butyl Cellosolve there is added 10.0 g of amidated polymer obtained in part (b). After mixing, the resulting clear solution is coated on Alodine aluminum panels. The coatings are cured for 1 week at ambient temperature. The resulting coating is soft, tacky, and swelled but not dissolved by, methylene chloride.

EXAMPLE 17

(a) A pre-dried 3 liter, 4-neck, round-bottomed flask is fitted with a thermometer, a "Thermowatch" (i.e., a thermostat control), a nitrogen inlet, a heating mantle atop a pot lifter, a 1000 ml pressure-equalizing addition funnel, a water-cooled condenser, a mechanical stirrer. The flask is charged with 236 g xylene, 32 g methanol (1.0 mol), and 25.2 g potassium t-butoxide (0.22 mol) and warmed to 60° C. At 60° C. a mixture of 152.0 g butyl methacrylate (1.07 mol) and 455.8 g methyl methacrylate (4.56 mol) is added dropwise. Little external heating is necessary to maintain the temperature of the reaction mixture between 65°-70° C. A mild exotherm occurs during the monomer addition. Approximately one hour after addition of monomers is completed, a sample is removed, quenched with a few drops of trifluoroacetic acid and analyzed by glc. Only a few percent residual monomer is observed by this method of analysis. Addition of a mixture consisting of 236 g xylene, 152.0 g BMA (1.07 mol) and 455.8 g MMA (4.56 mol) is made at a rate which sustains a mild exotherm (temperature is maintained at 70° C. with but little external heating). Approximately one hour after addition of the monomer mixture is completed a sample of the orange liquid obtained shows essentially no residual monomer by glc analysis. The product (1745 g at 72% solids), upon analysis by gel permeation chromatography, has a $\overline{M}_w$ of 1440 and $\overline{M}_n$ of 1220, with $\overline{M}_w/\overline{M}_n$ equal to 1.18.

(b) A one-liter, four-necked, round-bottomed flask equipped with an addition funnel, a mechanical stirrer, a thermometer, a "Thermowatch", an oil batch utilized with a pot lifter, and a variable take-off distillation head is charged with 6.08 g (3.98 mols, 72% solids in xylene) of the co-oligomer of 75% methyl methacrylate (MMA) and 25% butyl methacrylate (BMA) prepared in part (a), 82.6 g (0.80 mol of diethylenetriamine (DETA) and 44.0 g (8.4 wt. percent on solids) of butyl Cellosolve (BC). The reaction mixture is brought to 140° C. with a pre-heated oil batch. This temperature is then maintained by removal of solvent and by-products during the course of the reaction. Xylene is added whenever necessary to keep the viscosity of the mixture within reasonable limits. When the loss of amine titer reaches 35-40% of the initial charge (13 hours), heating is terminated. The oil bath is removed and xylene is distilled under reduced pressure (above 100 mm Hg) as the temperature of the mixture drops from 140° to 80° C. When the solids content of the reaction mixture reaches 85-90%, water (about 550 g) is added gradually at 80° C. The product is recovered as an aqueous solution with the following specifications (the low molecular weight polyamine therein having an amino functionality of about 2.4):

| Solids | 40.8% |
|---|---|
| Viscosity (Brookfield, spindle 4, 6 RPM, 25° C.) | 21,000 cps |
| Amine Equivalent Weight | 877 |
| Total Titer | 1.82 meq/g |
| Acid Number | 38.1 |

(c) Coatings (1) To 7.5 g of the polymer solution obtained in part (b), there is added 1.0 g of trimethylolpropane triacrylate and 1.0 g of butyl Cellosolve whereby a clear, homogeneous solution is produced. Thin films of this solution are cast in aluminum weighing dishes. After two hours at ambient temperature clear, soft, non-tacky films formed. After aging for one hour at 60° C. and one hour at 100° C. a hard, tough film is produced which is insoluble in methylene chloride and water. The film remains clear after 5 days immersion in water at ambient temperature.

(2) To 9.2 g of the part (b) product there is added 1.0 g of butyl Cellosolve and 1.0 g of neopentyl diacrylate. A clear, homogeneous solution results which yields a clear, tack-free coating after one hour at ambient temperature when cast as a thin film in an aluminum weighing dish. After curing for 1 hour at 60° C. and 1 hr. at 100° C. a clear somewhat brittle film is obtained which is insoluble in methylene chloride.

(3) To 20.0 g of the part (b) product there is added 4.0 g of butyl Cellosolve and 4.5 g of a 50% solution of trimethylolpropane triacrylate dissolved in butyl Cellosolve. The resulting clear solution is cast as a 6-mil wet film on Bonderite 1000 steel. After curing for 1 week at ambient temperature, the coating obtained has a KHN of 11.5 and a pencil hardness of 2H, is swelled but not dissolved by methylene chloride, and shows good resistance to both acetone and toluene.

EXAMPLE 18

(a) A mixture of 304.4 g of the oligomer of 75 methyl methacrylate/25 butyl methacrylate obtained in Example 14 (a), 46.5 of hexamethylenediamine (HD), 22 g of butyl Cellosolve and 20 g of toluene is heated at 135° C. for 21 hours; solvent is removed by distillation to maintain reaction temperature, and an additional 22 g of butyl Cellosolve, 23.2 g of ethylene glycol and 70 g of xylene are added during the course of the reaction to reduce product viscosity. The product, which may be diluted with water, has a solids content of 58.8%, a calculated amido functionality of 2.4, and an amine nitrogen titer of 1.70 meq/g.

(b) To 14.0 g of amidated polymer solution obtained in part (a) there is added 2.0 g of acetone, 2.0 g of butyl Cellosolve, and 4.48 g of a 50% solution of trimethylolpropane triacrylate. After mixing for 10 minutes, the solution is coated as a 6-mil wet film on Bonderite 1000 steel panels.

After drying for one week under ambient conditions a clear, glossy coating with a KHN of 0.9 and a pencil hardness of F is obtained. When this coating is heated for 24 hours at 140° F. the pencil hardness increases to 2H. The coating swells but does not dissolve in methylene chloride after one week ambient curing.

EXAMPLE 19

(a) Alpha-Olefin/EA/BA Co-Poligomer

To a 2-liter stirred Parr autoclave there is added 560 grams of propylene trimer; the reactor is sealed and sparged with nitrogen and heated to 190° C. where the pressure becomes 40 psig. The gradual addition of a mixture of 120 g of ethyl acrylate, 120 g of n-butyl acrylate and 1.2 g of cumene hydroperoxide is started at constant rate. The addition is completed over a period of 4 hours at the end of which time the temperature is 220° C. and the pressure 115 psig. The reactor is heated an additional 1.0 hr. at 190°±5° C. and then cooled. The reaction product is stripped of unreacted monomers at a pot temperature of 50°–100° C./5–10 mm Hg of low molecular weight volatiles at a pot temperature of 210°/0.1–5 mm Hg. The undistilled residual product, 200 grams yield, is used without further purification.

(b) Amidation

To 525.0 g of the copoligomer product obtained in part (a) there is added 525.0 g of butyl Cellosolve and 252.4 g of ethylenediamine. The solution is heated at 115° C. for 33 hours, and then stripped under reduced pressure (10 mm Hg) to remove 300 g of solvent. An additional quantity of 500 g of butyl Cellosolve is added, and the resulting solution is again stripped under reduced pressure until a solution containing 85.9% solids is obtained. The amber solution obtained has an amine titer of 3.57 ME/g based upon solids, and contains about 0.33% residual ethylenediamine by gas chromatography.

(c) Coating System

To 5.0 g of amidated product obtained in part (b) there is added 5 g of butyl Cellosolve and 2.0 g of acetone and the mixture is stirred until a homogeneous solution results. To this solution is added 7.31 g of a solution of 7.50 g of Actomer X-80 dissolved in 2.50 g of butyl Cellosolve. After stirring for 5 minutes a 6-mil wet film is case on a Bonderite 1000 test panel. After curing for 3 days at ambient temperature (~23° C.) the coating has a KHN of 4.85, a reverse impact resistance of greater than 160 in-lbs, is swelled but not dissolved by methylene chloride, and is moderately resistant to a 10% aqueous acetic acid solution.

EXAMPLE 20

(a) Preparation of Poly(Styrene/MA//82.9/17.1)

To 1076 g of 2-butoxyethanol, heated to 136° C. under a nitrogen atmosphere, with rapid stirring, is added a solution of 2080 g of styrene, 430 g of methyl acrylate, and 107 g of t-BP (75% solution in mineral spirits) over a period of 3 hours.

When the addition is complete, the solution is held at a temperature of 136° C. for 1 hour, then an additional 10.8 g of 75% t-BP is added, and heating at 136° C. continued for 1 hour before cooling.

The resulting solution is clear and contains 69.9% solids (2 hours/125° C.). Gel permeation chromatography (GPC) shows $\overline{M}_n$ 4,600; $\overline{M}_w$ 13,900. When diluted to 50% solids with 2-butoxyethanol the viscosity is 1,640 cps.

(b) Amidation with EDA

To 2200 g of the solution obtained in part (a) there is added 880 g of 2-butoxyethanol and 430.5 g of ethylene diamine. The resulting solution is heated at 136° C. for 120 hours and then cooled to 90° C. and vacuum distilled as described in Example 1 (b) to remove residual ethylene diamine to produce a clear, light amber colored solution at 48.5% solids having an amine titer of 1.46 ME/g, and a viscosity of 9620 cps.

(c) Conversion of the Amidated Copolymer is Part (b) to a Polyimine by Reaction with Ethyl Amyl Ketone To 2960 g of the amidated copolymer prepared in part (b) there is added 538 g of ethyl amyl ketone (5-methyl-3-heptanone) and 600 g of cyclohexane. The solution is heated at reflux (94° C.) for 4.5 hours, during which time 19 ml of water is azeotropically distilled and collected by means of a Dean-Stark trap between the flask and condenser. Practically all of the primary amine groups ar converted to imine groups.

The solution is then distilled under vacuum (100° C./10 mm) to remove cyclohexane and unreacted ketone. Then, 134.5 g of ethyl amyl ketone is added to the solution, which contains 48.5% solids, has an amine titer of 1.46 ME/g, and a viscosity of 5850 cps.

(d) Coating Prepared from the Polyimine (Part c) and a Polyacrylate (1) To 100.0 g of Actomer X-80® there is added 100.0 g of xylene, 200.0 g of titanium dioxide pigment and 200.0 g of sand. After grinding for 0.5 hours, the sand is removed by filtration.

(2) An enamel is prepared by the formulation:

| Component | Parts |
| --- | --- |
| Sand mill grind | 100.0 |
| Polyimine (Part c) | 137.1 |
| Actomer X-80® | 25.5 |
| Xylene | 129.5 |
| Ethyl Amyl Ketone | 24.2 |
| Baysilone (flow and leveling agent) | 0.16 |
| 2-butoxyethanol | 0.4 |
| Enamel solids | 40% by weight |
| Pigment/Binder Ratio | 30/70 |
| Viscosity (#4 Ford cup) | 18 sec |
| Usable Pot Life | ca. 5 hours |
| Set Time | ca. 30 minutes |
| Tack-free Time | ca. 90 minutes |

(e) Properties of Spray-Applied Coating at 1.5 mils on Bonderite® 1000 After 7 Days Air-Dry at Ambient Temperature and Relative Humidity (45%)

| | |
| --- | --- |
| Knoop Hardness | 7 |
| Flexibility (⅛" Mandrel) | pass |
| Reverse Impact | 20 in.-lb. |
| Print Resistance (2 Psi/1 hr/140° F. | lt.-med. |
| Chemical Resistance (½ hr Patch Tests) | |
| Acetic Acid (10% in H₂O) | 2H→B* |
| NaOH (10% in H₂O) | 2H→2H |
| Gasoline | 2H→H* |
| Xylene | 2H→6B* |
| Ethanol | 2H→6B* |

*Hardness recovers after evaporation of solvent.

Weather-O-Meter (1500 hours)

% Gloss Retention 60°/20°; 96/90+.

EXAMPLE 21

(a) Preparation of Poly(styrene/MA//78.4/21.6)

The procedure described in part (a) of previous example 20 is repeated using 1076 g of 2-butoxyethanol, 1968 g of styrene, 542 g of methyl acrylate, an initial charge of 179.3 g of 75% t-BP, and a final charge of 17.9 g thereof. The polymerization temperature is 145° C. and the monomer feed time 3.0 hours. The resulting solution is clear, contains 71.1% solids, has a viscosity of 85,400 cps. and $\overline{M}_w$ and $\overline{M}_n$, determined by GPC, are 6,290 and 2,500, respectively.

(b) Amidation

A solution of 1700 g of the copolymer solution prepared in part (a), 680 g of 2-butoxyethanol and 340.7 g of ethylene diamine is heated for 25 hours at 154° C., and then vacuum distilled as previously described to remove excess ethylene diamine.

The final solution contains 55.2% solids, has an amine titer of 1.29 ME/g, and a viscosity of 13,600 cps.

(c) Conversion of the Amidated Copolymer to a Polyimine

To 2260 g of the amidated resin prepared in part (b) there is added 418.3 g of ethyl amyl ketone (EAK) and 226.0 g of cyclohexane. The solution is heated at reflux for 10.3 hours during which time 13.7 g of water is collected by means of a Dean-Stark trap. The final solution, after vacuum distillation of cyclohexane and excess ethyl amyl ketone and readdition of 104.5 g of the latter, is clear, red-amber in color, contains 56.7% solids, has a viscosity of 13,520 cps, and an amine titer of 1.28 ME/g. Essentially all of the primary amine groups of the EDA-amination product of part (b) are converted to EAK-imine group.

(d) Clear Coating of the Polyimine with a Polyacrylate

A solution is prepared by mixing 102 g of the polyimine prepared in part (c) with 84 g of a 50% by weight solution of Actomer X-80 dissolved in xylene. This solution is coated on Bonderite 1000 and after 7 days drying under ambient conditions of temperature and humidity (25° C. and 40-60% R.H.) yields a clear film with a Knoop Hardness of 4.6, a pencil hardness of 2H, and a reverse impact of 140 in.-lb. The coating is resistant to common solvents.

EXAMPLE 22

(a) Preparation of Poly(Styrene/Butyl Acrylate//70.9/29.1)

The procedure described in part (a) of example 21 is repeated using 1076 g of 2-butoxyethanol, 1780 g of styrene, 730 g of butyl acrylate (BA), an initial charge of 179.2 g of 75% t-BP (in mineral spirits) and a final charge of 17.9 g thereof, a monomer feed time of 4.5 hours and a polymerization temperature of 150° C.

The resulting solution is clear, contains 72.9% solids, had a viscosity of 14,000 cps. and $\overline{M}_w$ and $\overline{M}_n$ of 5980 and 2420, respectively.

(b) Amidation

A solution of 1677 g of the copolymer solution prepared in part (a), 671 g of 2-butoxyethanol and 304 g of ethylene diamine, is heated for 24 hours at 155° C. and then for 48 hours at 170° C. Excess diamine is then removed by vacuum distillation as previously described. The final solution contains 58.5% solids, has an amine titer of 0.51 ME/g, is reddish brown in color, and has a viscosity of 1550 cps.

(c) Conversion of the Amidated Copolymer to a Polyimine

To 2026 g of the amidated copolymer prepared in part (b) there are added 203 g of cyclohexane and 155.6 g of ethyl amyl ketone. The solution is heated at reflux for 16 hrs., during which time 1.2 ml of water is collected by means of a Dean-Stark trap. The final solution, after vacuum distillation of cyclohexane and excess ethyl amyl ketone and readdition of 8.6 g of the latter, is clear, reddish brown in color, contains 0.51 ME/g amine, and has a viscosity of 1550 cps.

(d) Coating Prepared From the Polyimine of Part (c) with a Polyacrylate

A coating composition is prepared as described in example 21 (d) substituting the polyimine obtained in part (c) hereof for that used in Example 21 (d) and applied to cold-rolled steel panels at ambient conditions of temperature (25° C.) and relative humidity (20% to 50% R.H.). The resulting 3-mil thick coatings air-dried to produce a clear film having properties similar to those obtained in example 21 (d).

EXAMPLE 23—Polyacrylated Styrene/GlycidylMethacrylate Copolymer (a) Styrene/Glycidyl Methacrylate Copolymer To 1800 g of refluxing xylene, sparged with nitrogen there is added dropwise over a period of 3 hours, a solution of 1418 g of styrene, 382 g of glycidyl methacrylate, and 51.4 g of 75% t-BP (in mineral spirits). Then, an additional charge of 5.1 g of 75% t-BP is added, and heating at reflux is continued for 1 hour before cooling to room temperature. A sparkling clear and colorless polymer solution containing 50.1% solids, having a viscosity of 102 cps., and an $\overline{M}_w$ and $\overline{M}_n$ by determined GPC of $1.29 \times 10^4$ and $3.75 \times 10^2$, respectively, is obtained.

(b) Addition of Acrylic Acid to the Styrene/Glycidyl Methacrylate Copolymer

To 3600 g of the polymer solution prepared in part (a) there is added 302 g of acrylic acid. Air is slowly bubbled through the solution while it is heated on a steam bath to maintain a pot temperature of 90° C. for a period of 27.5 hrs. The initial solution titer of 1.075 ME/g after 27.5 hrs. is reduced to 0.446 ME/g. Thus, 0.629 ME/g of acrylic acid is consumed by reaction with glycidyl epoxide groups in the copolymer.

The solution is distilled under vacuum (20–30 mm) to remove residual acrylic acid by codistillation with xylene. A total of 3200 g of xylene is added and distilled. The total distillate weighing 3644 g contains 98.5 g of acrylic acid by titration. The residual polymer solution weighs 3250 g and contains 15.0 g of free acrylic acid. The total acrylic acid consumed is 188.5 g. The calculated equivalents of acryloxy

pendant and/or terminal groups in the polyacrylate copolymer solution is therefore 0.806 ME/g.

EXAMPLE 24

(a) Copolymer of Styrene and the Diisopropyl Ketone Imine of 2-Aminoethyl Methacrylate (U.S. Pat. No. 3,037,969)

A stream of dry nitrogen is bubbled thru 135 g of xylene as it is heated with stirring to reflux. To the hot solvent is added over a period of 3.75 hours a mixture of 78.0 g (0.25 mol) of styrene and 54.8 g (0.25 mol) of 2-diisopropyl ketiminoethyl methacrylate containing 3.5 g of 75% t-BP. The slow nitrogen flow through the mixture is continued at the mixture is refluxed another half hour, treated with an additional 0.4 g of 75% t-BP in 0.4 g xylene, and refluxed another half hour. The resulting hazy poligomer solution has 49.3% solids (2 hr. at 125° C.) and contains 0.906 meq N/g (1.81 meq NH/g) by titration with 0.1 N HClO$_4$ in HOAc.

(b) Coatings (1) To 5.0 g (9.05 meq NH) of the poligomer solution obtained in part (a) is added 4.9 g (9.05 meq C=C) of a 50% solution of a diacrylate ester of a liquid Bisphenol A epoxy resin in butyl carbitol.

(2) To 10.0 g (18.1 meq NH) of the poligomer solution obtained in part (a) is added 3.9 g (18.1 meq C=C) of a diacrylate ester of ethoxylated Bisphenol A epoxy resin.

(3) To 2.0 g (3.63 meq NH) of the poligomer solution obtained in part (a) is added 8.7 g (3.61 meq C=C) of a solution of acrylated glycidyl methacrylate/styrene copolymer obtained in example 23 (b).

All of the above air-cure (at ambient conditions of temperature and humidity, e.g. 25° C. and 50-70% R.H.) to clear, hard, tough crosslinked films which are not affected by half hour exposure to 10% acetic acid or 10% sodium hydroxide.

EXAMPLE 25

(a) The primary amine groups in the amidation products obtained in examples 1(b), 2(b), 7(b), 7(c), 13(b), 16(b), 19(b), 20(b), 21(b) and 22(b) are converted to diisopropyl ketimine groups by adding an excess of diisopropyl ketone to each of the amidation products, based on their respective amine titer, along with cyclohexane as a solvent, generally using the procedure described in example 20(c).

(b) Coating compositions are prepared by mixing (1) each of the imine products obtained in part (a) hereof with (2) the acrylic acid adduct of an epoxidized linseed oil containing an average of about 2.2 vic-epoxy groups per molecule, substantially all of such groups being reacted with acrylic acid to form a polyacryloxy compound having an average of at least two unsaturated acryloxy groups therein, and (3) 2-butoxyethanol or other solvent.

(c) The coating compositions are stored in anhydrous condition until they are applied on the surfaces to be coated. They are formed into films of about 3-mil thickness at ambient conditions of about 20° to 25° C., and about 50 to 90% R.H. The cured films are comparable in properties to those obtained from the corresponding primary amine containing amidation products.

We claim:

1. A composition, suitable for coating, impregnating, and/or bonding purposes and adapted to be cured under ambient conditions, comprising a liquid vehicle containing:

(1) A soluble vinyl addition polymer of monoethylenically unsaturated monomers, said polymer containing a plurality of primary or secondary amine groups and/or aldimine or ketimine groups pendant from spaced mers or polymer units in the polymer chain, (2) At least one compound having at least two acryloxy groups of the formula

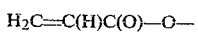

and (3) Optionally when component (1) is a polymer containing only primary and/or secondary amine groups, a volatile ($C_3$-$C_{10}$) ketone or ($C_3$-$C_{10}$) aldehyde stabilizer which retards the reaction of (1) and (2) under ambient conditions, wherein component (1) comprises at least one of:

(a) An amidation product of a vinyl addition copolymer of a mixture of monoethylenically unsaturated monomers containing a lower alkyl (meth)acrylate with a polyamine having at least two amino groups selected from primary and secondary amino groups and having their nitrogen atoms attached to aliphatic carbon atoms, (b) A ketimine or aldimine derivative of (a) obtained by reaction of primary amine groups in (a) with a ($C_3$-$C_{10}$) ketone or a ($C_3$-$C_{10}$) aldehyde, and (c) A soluble vinyl addition copolymer of a monomer having a general formula H-I, H-II, H-III or E-I, these formulas being as follows:

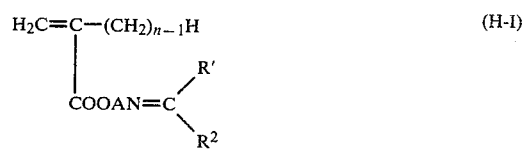

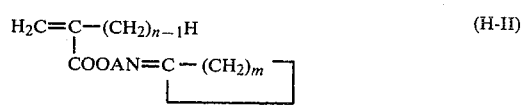

and

where
m is an integer having a value of 4 to 5,
n is an integer having a value of 1 to 2,
A is a $C_2$-$C_{12}$ alkylene group,
R' is a ($C_1$-$C_{12}$) alkyl or cycloalkyl group,
$R^2$ is a ($C_1$-$C_{12}$) alkyl or cycloalkyl group, and
$R^3$ is selected from the group consisting of phenyl, halophenyl, and alkoxyphenyl in which the alkoyl group has one to four carbon atoms, and

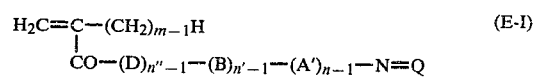

wherein:
Q is selected from the group consisting of

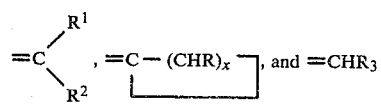

R is H or it may be methyl in one CHR unit,
$R^1$ is selected from the group consisting of ($C_1$-$C_{12}$) alkyl and cyclohexyl groups,
$R^2$ is selected from the group consisting of ($C_1$-$C_{12}$) alkyl and cyclohexyl groups,
$R^3$ is selected from the group consisting of phenyl halophenyl, ($C_1$-$C_{12}$) alkyl, cyclohexyl, and ($C_1$-$C_4$) alkoxyphenyl groups,
A', B, and D are the same or different oxyalkylene groups having the formula

R° being individually selected from the group consisting of H and alkyl radicals having 1 to 2 carbon atoms,
m is an integer having a value of 1 to 2, x is an integer having a value of 4 to 5,
n is an integer having a value of 1 to 200,
n' is an integer having a value of 1 to 200,
n" is an integer having a value of 1 to 200, the sum of n-1, n'-1, and n"-1 having a value of 2 to 200, the relative amount of (2) to (1), based respectively on acryloxy unsaturation equivalency of (2) and amine (primary and/or secondary) nitrogen equivalency of (1), being such as to provide at least from 0.5 to 3.5 equivalents of (2) for each equivalent of (1).

2. A composition according to claim 1 wherein component (1) is a copolymer of a (meth)acryloxyalkyl ketimine or aldimine as defined in formulas H-I, H-II and H-III therein, or of a (meth)acryloxyalkyloxyalkyl ketimine or aldimine of formula E-I therein.

3. A composition according to claim 2 wherein component (1) is a copolymer of diisopropylketiminoethyl methacrylate.

4. A composition according to claim 3 wherein component (2) is a diacrylate ester of a liquid epoxy resin.

5. A composition according to claim 3 wherein component (2) is an acrylated glycidyl methacrylate/styrene copolymer having at least two unsaturated acryloxy groups.

6. A composition according to claim 1 wherein component (2) also contains a monoethylenically unsaturated monomer of the formula $$H_2C=C(R)-X \qquad \text{IV}$$

wherein R is H or CH$_3$, preferably H, and X is an electron-withdrawing group, examples of such compounds being acrylonitrile, alkyl (meth)acrylates, (meth)acrylamides, and N-alkyl-substituted-(meth)acrylamides.

7. A composition according to claim 1 wherein component (1) is a soluble vinyl addition polymer amidation product (a) containing amine groups, at least a portion of such groups being at least partially blocked by reaction thereof with isobornyl acrylate prior to mixing components (1) and (2) whereby pot-life of the composition is extended, and the properties of coatings obtained are modified.

8. A composition according to claim 1 wherein the relative amount of (2) to (1) based respectively on acryloxy unsaturation equivalency of (2) and amine (primary and/or secondary) nitrogen equivalency of (1) is such as to provide from about 1 to 2 equivalents of (2) for each equivalent of (1).

9. A composition according to claim 1 wherein amine-containing or imine-containing polymer in (1) has a molecular weight in the range of at least about 600 to 5,000 number average.

10. A composition according to claim 1 wherein (2) also contains at least one compound having a single (meth)acryloxy group.

11. A composition according to claim 1 wherein component (1) comprises an amidation product of a vinyl addition copolymer of monoethylenically unsaturated monomers containing a lower alkyl (meth)acrylate with a polyamine having at least two amino groups selected from primary and secondary amino groups and having their nitrogen atoms attached to aliphatic carbon atoms.

12. A composition according to claim 11 wherein the polyamine is selected from those having the formula $$H_2N-R°-(NHR°)_n-NH_2 \qquad \text{(II)}$$

wherein R° is an alkylene group having 2 to 3 carbon atoms and n is 0, 1, 2 or 3.

13. A composition according to claim 11 wherein the polyamine is ethylenediamine and the amidation product in (1) contains units of the formula

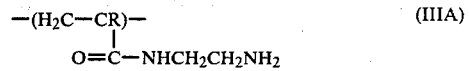

wherein R is H or CH$_3$.

14. A composition according to claim 11 wherein the polyamine is 1,3-propylenediamine.

15. A composition according to claim 11 wherein component (3) is present and comprises a volatile aldehyde or ketone having 3 to 10 carbon atoms whereby primary amine groups in component (1) are converted to aldimine or ketimine groups thereby retarding the reaction between components (1) and (2) under ambient conditions.

16. A composition according to claim 1 wherein (3) is present and comprises a volatile aldehyde or ketone having 3 to 10 carbon atoms.

17. A composition according to claim 1 in which component (2) comprises a simple ester obtained by the reaction of a polyol having at least two hydroxyl groups with acrylic acid or methacrylic acid.

18. A composition according to claim 17 in which component (2) is trimethylolpropane triacrylate.

19. A composition according to claim 1 in which component (2) is a poly(200)ethylene glycolacrylate.

20. A composition according to claim 1 in which component (2) comprises a urethane acrylate obtained by reacting at least two isocyanate groups of a polyisocyanate with a hydroxyalkyl acrylate.

21. A composition according to claim 1 in which component (2) comprises a polyester having at least two acrylate groups obtained by esterifying hydroxy groups with (meth)acrylic acid.

22. A composition according to claim 1 in which component (2) comprises a polyfunctional acrylate obtained by reaction of a hydroxyalkyl acrylate with (a) a dicarboxylic acid having 4 to 15 carbon atoms, (b) a polyepoxide having terminal glycidyl groups, or (c) a polyisocyanate having terminal reactive isocyanate groups.

23. A composition according to claim 1 in which component (2) comprises a acrylate-terminated polyester made from acrylic acid, a polyol having at least three hydroxyl groups, and a dicarboxylic acid.

24. A composition according to claim 1 in which component (2) comprises a polyfunctional acrylate obtained by the reaction of acrylic acid with at least 2 epoxy groups of an epoxidized drying oil, or epoxidized drying oil fatty acid ester, or amide thereof, or a corresponding alcohol, containing at least two epoxy groups.

25. A composition according to claim 1 in which component (2) comprises a urethane derivative or amine derivative of a polyfunctional acrylate of claim 21 obtained by the reaction of an isocyanate or amine respectively with the polyfunctional acrylate while retaining at least two acrylate groups therein.

26. A composition according to claim 1 in which component (2) comprises an acrylic acid adduct to an epoxidized vegetable or animal oil having ten or more carbon atoms in the fatty acid component and sufficient unsaturation to provide at least two epoxy groups in the epoxidized oil.

27. A composition according to claim 26 in which the oil is soybean oil.

28. A composition according to claim 26 in which the oil is linseed oil.

29. A composition according to claim 1 in which component (2) comprises a polyacrylate obtained by the reaction of acrylic acid by addition to the epoxy groups of an aromatic bisphenol-based epoxy resin.

30. A composition according to claim 1 in which component (2) comprises a diacrylate ester of a liquid bisphenol A epoxy resin.

31. A composition according to claim 1 in which component (2) comprises a polyacrylate obtained by the addition of acrylic acid to a liquid vinyl polymer having pendant glycidyl groups resulting from addition polymerization of a monomer mixture comprising glycidyl acrylate, glycidyl vinyl ether or glycidyl vinyl sulfide.

32. A composition according to claim 1 in which component (2) comprises a polyfunctional acrylate derived from acrylic acid anhydride and a polyepoxide.

33. A composition according to claim 1 in which component (2) comprises a polyfunctional acrylate urethane ester obtained from the combining of a hydroxyalkyl acrylate, a diisocyanate, and a hydroxy functional alkyd condensate.

34. A composition according to claim 1 in which component (2) comprises a acrylate-terminated polyester obtained by the reaction of a polycaprolactone diol or triol with a diisocyanate, and a hydroxyalkyl acrylate.

35. A composition according to claim 1 in which component (2) comprises a urethane polyacrylate obtained by the reaction of a hydroxyl-containing ester of a polyol with acrylic acid and a polyisocyanate.

36. An essentially anhydrous composition according to claim 1 wherein component (1) consists essentially of a ketimine-containing amidation product of a vinyl addition copolymer containing a lower alkyl acrylate with an aliphatic polyamine having at least two primary amine groups, substantially all of the primary amine groups in the amidation product having been converted into ketimine groups by reaction with an aliphatic or alicyclic $C_3$ to $C_{10}$ ketone with removal of the water liberated by that reaction, whereby the composition has improved pot-life and is hydrocurable when applied to surfaces of a substrate for coating, adhering or sealing thereof under ambient conditions of temperature (20°–25° C.) and relative humidity of at least 20%.

37. A composition according to claim 36 wherein the polyamine is ethylenediamine and the ketone is diisopropyl ketone.

38. A composition according to claim 36 wherein the polyamine is ethylenediamine and the ketone is ethyl amyl ketone.

39. A composition according to claim 1 in which component (1) contains no aldimine or ketimine groups and the composition contains volatile ketone or aldehyde stabilizer which retards reaction of amine groups in component (1) with component (2).

* * * * *